United States Patent [19]

Shinya et al.

[11] Patent Number: 4,928,652
[45] Date of Patent: May 29, 1990

[54] ENGINE CONTROL SYSTEM FOR SUPPRESSING CAR BODY VIBRATION

[75] Inventors: Yoshiyuki Shinya, Hiroshima; Yoshitaka Tabara, Higashihiroshima; Itaru Okuno, Hiroshima; Tadashi Kaneko, Hiroshima; Tomomi Watanabe, Hiroshima, all of Japan

[73] Assignee: Mazda Motor Corporation, Hiroshima, Japan

[21] Appl. No.: 244,115

[22] Filed: Sep. 14, 1988

[30] Foreign Application Priority Data

Sep. 17, 1987 [JP] Japan .............................. 62-235969
Jan. 29, 1988 [JP] Japan .............................. 63-17420

[51] Int. Cl.⁵ .............................................. F02P 1/00
[52] U.S. Cl. ................................. 123/417; 123/425; 123/419
[58] Field of Search ............... 123/419, 417, 418, 416, 123/422, 352

[56] References Cited

U.S. PATENT DOCUMENTS

| | | | |
|---|---|---|---|
| 4,345,559 | 8/1982 | Kuttner et al. | 123/198 R |
| 4,461,257 | 7/1984 | Hosaka et al. | 123/419 |
| 4,489,692 | 12/1984 | Haraguchi et al. | 123/419 |
| 4,498,438 | 2/1985 | Sato | 123/418 |
| 4,509,477 | 4/1985 | Takao et al. | 123/419 |
| 4,513,721 | 4/1985 | Ina et al. | 123/419 |
| 4,527,523 | 7/1985 | Daumer et al. | 123/419 |
| 4,532,902 | 8/1985 | Onizuno et al. | 123/417 |
| 4,601,272 | 7/1986 | Nagai | 123/425 |
| 4,676,212 | 6/1987 | Kashimura et al. | 123/425 |

FOREIGN PATENT DOCUMENTS

| | | | |
|---|---|---|---|
| 58-48738 | 3/1983 | Japan | 123/419 |
| 59-165865 | 9/1984 | Japan | 123/419 |

Primary Examiner—Raymond A. Nelli
Attorney, Agent, or Firm—Staas & Halsey

[57] ABSTRACT

An engine control system for suppressing vibration of a car body, primarily at acceleration thereof, by varying engine output torque. The system for suppression of the car body vibration takes into consideration car vibration detection delay time created by the intermittent detection of vibration data. The system includes a detector for intermittently detecting data relating to car body vibration, a period setting device for setting a period of car body vibration, a delay time setting device for setting a delay time corresponding to a detection delay time due to the intermittent detection of the vibration data detector, and a torque controller for controlling engine output torque by advancing a phase of engine output torque control timing by the delay time corresponding to the detection delay time, which is set by the delay time setting device, in each period of car body vibration set by the period setting device.

15 Claims, 20 Drawing Sheets

| GP | 1 | 2 | 3 | 4 | 5 |
|---|---|---|---|---|---|
| 1/4 PERIOD(=T90°)(ms) | 100 | 68 | 50 | 40 | 35 |
| T90°/5 (ms) | 20 | 13 | 10 | 8 | 7 |
| RESONANCE FREQUENCY (HZ) | 2.5 | 3.7 | 5.0 | 6.2 | 7.0 |
| $N_{MIN1}$ (rpm) | 450 | 670 | 860 | 1125 | 1250 |
| $N_{MIN2}$ (rpm) | 900 | 1350 | 1750 | 2250 | 2500 |
| $N_{MIN3}$ (rpm) | 300 | 450 | 580 | 750 | 840 |

FIG. 7

ENGINE CONTROL SYSTEM FOR SUPPRESSING CAR BODY VIBRATION

BACKGROUND OF THE INVENTION

This invention relates to an engine control system and, more particularly, to an engine control system the purpose whereof is to reduce car body vibration.

Conventionally, when a vehicle in which power is transferred without the intervention of a fluid coupling or the like is subjected to comparatively sudden acceleration, the vehicle experiences front-and-rear vibration in which the car body wobbles. The reason for this is that a change in engine torque produces a source of vibration which is increased by resonance of the drive system. Though attempts have been made to solve this problem by limiting the change in engine torque or rationalizing the rigidity of the drive system, the results have not been entirely satisfactory. One reason for this is that resonance itself cannot be suppressed by limiting a change in torque. Another is that increasing drive system rigidity not only has little effect upon reducing vibration but also invites a increase in engine weight and poorer fuel economy.

Accordingly, systems have been proposed for suppressing front-and-rear vibration of a car body by varying engine torque at the time of acceleration without inviting the inconveniences of increased engine weight and the like. For example, see Japanese Patent Application Laid-Open (KOKAI) Nos. 59-165865, 58-48738, 59-113269 (U.S. Pat. No. 4,527,523) and 60-6071 (U.S.-Pat. No. 4,498438), as well as U.S. Pat. No. 4,345,559. For instance, in the system of Japanese Patent Application Laid-Open No. 58-48738, a change in engine rotational speed is sensed and it is so arranged that engine torque takes on a reciprocal characteristic with respect to the change in rotational speed. More specifically, the output of an engine rpm sensor is passed through a low-pass filter adapted to extract the vibration frequency component of drive system torsion, thereby detecting a rotational variation. If this value exceeds a threshold value, the system effects control of ignition advance angle commensurate with the rotational variation.

The inventors, who have taken notice of the fact that car body vibration is not actually suppressed even when torque control is performed in accordance with the prior art set forth above, have discovered that the cause of this problem resides in the fact that the timing of the change in engine torque brought about by engine torque control does not match the actual timing of car body vibration. In other words, though the prior art mentioned above primarily focuses on matching the period of car body vibration and the control period of torque control, car body vibration cannot be suppressed because of a phase difference between the timing of torque control and car body vibration.

In pursuing the cause of the aforementioned mismatch between the timing of the change in engine torque and the actual timing of car body vibration, namely the cause of the phase difference between torque control timing and car body vibration, the inventors have found that the cause resides in the fact that all of the prior-art systems depend upon an ideal control model of an engine. So far as reliance is placed upon an ideal model, a phase difference between torque control timing and car body vibration does not constitute a problem. In actuality, however, a variety of "control delays" occur.

Control delays arise for certain reasons. For instance, the control circuit (primarily a digital microcomputer) actually used in engine control is capable of acquiring only external data which is discrete in terms of time. For example, in a case where a control unit obtains data indicative of engine rotational speed, the control unit is adapted to perform computations based on the period at which at least two pulses are generated by a sensor provided on a crankshaft. However, since the result of a computation itself involves a time-wise lag element (which lag corresponds to the pulse generation interval), what is obtained is not realtime engine rotational speed, namely engine speed from one instant to the next. That is to say, at the moment engine rotational speed is acquired, the "control delay" has already occurred.

Further, the output of the engine rotational speed sensor contains noise In order to cancel out this error component, the usual practice is to average, over several revolutions, the engine rotational speed obtained as described above. However, the fact that this average value is actually delayed in time because of the time-shared control of the digital microcomputer is also a cause of a control delay.

Accordingly, even if the prior art succeeds in matching the control period of torque control with the period of car body vibration, the control delays that inevitably arise in an electronic control system are neglected in the individual control periods of torque control. As a result, torque control is carried out based on past data corresponding to control delay. In addition, torque fluctuation and the natural vibration of the drive system resonate in certain cases, so that suppression of the front-and-rear vibration of the car body is delayed.

Thus, the torque control timing delay that arises in the electronic control system of the vehicle engine is one reason for the poor reduction in car body vibration in the prior art.

The inventors have pursued, from another standpoint, the cause of the aforementioned mismatch between the timing of the change in engine torque and the actual timing of car body vibration, namely the cause of the phase difference between torque control timing and car body vibration. As a result, the inventors have made an important discovery. Specifically, when engine output is transmitted to the wheels of the vehicle through the drive system inclusive of the transmission, thereby causing the car body to vibrate, drive system torsion results in a time-wise delay between the change in the rotational speed of the engine and the vibration of the car body. Though substantially constant while car body vibration is in a state of resonance, this delay time differs according to the operating state of the engine at the beginning of acceleration (particularly up to the time of the initial peak of vibration at the beginning of acceleration). The reason for this is that the aforementioned torsion in the drive system at the transition from cruising at a steady velocity to acceleration differs from that at the transition from a decelerating to an accelerating traveling state, by way of example. Accordingly, even if the control period of torque control is made to coincide with the period of car body vibration, the fluctuation in torque and the natural vibration of the drive system will resonate in certain cases unless the two timings match at the beginning of acceleration. The result will be a delay in the suppression of front-and-rear vibration of the car body.

Thus, the fact that the state of drive system torsion differs depending upon a variation in the operating state of the vehicle at acceleration is one reason for non-coincidence between the timing of torque control and the timing of car body vibration.

SUMMARY OF THE INVENTION

A first object of the present invention is to provide an engine control system capable of effective and rapid suppression of front-and-rear vibration produced in a car body at acceleration of the engine.

A second object of the present invention is to provide an engine control system capable of rapidly and reliably reducing car body vibration by eliminating the non-coincidence between torque control timing and car body vibration that is ascribable to a control delay inevitably produced in an electronic control system.

A third object of the present invention is to provide an engine control system capable of rapidly and reliably reducing car body vibration by eliminating the non-coincidence between torque control timing and car body vibration ascribable to the fact that a torque transmission delay in a mechanical drive system differs depending upon a difference in the operating state of the vehicle at the beginning of acceleration.

According to the present invention, the first object is attained by providing an engine control system for suppressing vibration of a car body at acceleration thereof by varying engine output torque, comprising: detecting means for detecting car body vibration; arithmetic means for computing, on the basis of detected car body vibration, a periodic control variable for controlling engine torque; synchronizing means for synchronizing the car body vibration detected by the detecting means and the control variable; and torque control means for controlling engine output torque based on the synchronized control variable. In accordance with this engine control system, car body vibration is suppressed by establishing phase coincidence between the period of car body vibration and the period of torque control.

According to the present invention, the second object is attained by providing an engine control system for suppressing vibration of a car body at acceleration by varying engine output torque, comprising: vibration data detecting means for intermittently detecting data relating to car body vibration; period setting means for setting a period of car body vibration; delay time setting means for setting a delay time corresponding to a control delay time which occurs when engine torque is controlled based on the period of car body vibration set by the period setting means; and torque control means for controlling engine output torque by advancing a phase of engine output torque control timing by the control delay time, which is set by the delay time setting means, in each period of car body vibration set by the period setting means. As a result of this arrangement, car body vibration at acceleration is suppressed. In accordance with this control system, the control delay time of the electronic control system is set by the delay time setting means, and the torque control means subjects torque control to phase control by including this delay time. Vibration is suppressed as a result.

When the data relating to car body vibration is a fluctuating value of engine rotational speed, the computed delay time is advanced by one fourth of the period of vibration. Accordingly, in accordance with an embodiment of the invention, the vibration data detecting means includes fluctuating value detecting means for detecting the fluctuating value of engine rotational speed; the delay time setting means includes means for computing a time which is one-fourth of the car body vibration period set by the period setting means and means for subtracting the one-fourth of the car body vibration period from the time corresponding to the control delay time; and the torque control means advances the phase of engine output torque control timing by the subtracted time.

In accordance with an embodiment of the present invention, an engine rotational speed is calculated based on a signal which is intermittently generated every prescribed crank angle.

In accordance with an embodiment of the present invention, since the period of vibration varies in accordance with the gear position of a transmission, the period set by the period setting means varies in accordance with it.

In accordance with an embodiment of the present invention, since the control delay time of the electronic control system is larger as an engine rotational speed is smaller, the delay time setting means sets the delay time to a larger value as the engine rotational speed is smaller.

In order to effect accurate and reliable suppression of vibration even at low rotational speed when the control delay time is large, the system of the invention includes means for detecting a signal which is intermittently generated every prescribed crank angle, means for calculating an engine rotational speed based on the signal, means for calculating fluctuating values of engine rotational speed and mean value calculating means for calculating a mean value of the fluctuating values of engine rotational speed; and when an engine rotational speed is low, the mean value calculating means shortens a computation period of the mean value the fluctuating values of engine rotational speed.

In order to effect accurate and reliable suppression of vibration even at low rotational speed when the control delay time is large, the system of the invention includes means for computing a time which is five-fourths of the car body vibration period set by the period setting means and means for subtracting five-fourths of the car body vibration period from the delay time corresponding to the control delay time; and the torque control means advances the phase of engine output torque control timing by the subtracted time when an engine rotational speed is low.

In accordance with an embodiment of the present invention, the low rotational speed region of the engine is defined as a region where the control delay time is longer than one-fourth of the car body vibration period.

According to the present invention, the third object is attained by providing an engine control system for suppressing vibration of a car body at acceleration by varying engine output torque, comprising: operating condition detecting means for detecting operating conditions which prevail prior to acceleration; acceleration detecting means for detecting acceleration; actuating means for actuating the torque control means a predetermined time after acceleration is detected by the acceleration detecting means; and varying means for varying the predetermined time in dependence upon the operating conditions which prevail prior to acceleration detected by the operating condition detecting means. In accordance with this arrangement, the timing of car body vibration and the timing of torque control are synchronized by altering, in dependence upon the operating conditions prior to acceleration, the timing at which torque control starts.

In an embodiment, the operating condition detecting means detects cruising of the vehicle at a steady velocity.

In another embodiment, the operating condition detecting means detects decelerating travel of the vehicle.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 7 is a chart in which data used in the first embodiment and in two modifications thereof are gathered in the form of a table;

DESCRIPTION OF THE PREFERRED EMBODIMENTS (General Description of the Embodiments)

First and second embodiments of the present invention will be described hereinbelow with reference to the accompanying drawings. According to the present invention the control period of torque control and car body vibration are optimized in terms of period and phase in such a manner that engine output torque control is capable of suppressing car body vibration.

The object of the first embodiment of the invention is to optimize the control period of torque control and the vibration of the car body in terms of period and phase by compensating for "control delay" which occurs in the electronic control system. In the first embodiment, a value which is the difference between a fluctuation in engine rotational speed and the average value of this fluctuation is adopted as control variable for controlling torque, and torque control is performed by shifting this control variable by an amount obtained by subtracting control delay time from one-quarter of the vibration period [i.e. (period of vibration)/4 - (control delay time)]. There are two modifications of the first embodiment. In view of the fact that there are cases where torque can no longer be controlled in the low rotational speed region of an engine with the basic first embodiment of the invention, these two modifications specially adapt control in order that such cases in which torque control cannot be performed are minimized.

An object of the second embodiment of the invention is to optimize the control period of torque control and the vibration of the car body in terms of period and phase by compensating for a shift between car body vibration and torque control timing that is ascribable to the torque transmission delay of a mechanical system. In this embodiment, a torque control start timing that agrees with car body vibration is obtained by detecting the start of acceleration and altering the moment at which torque control is started in dependence upon the operating conditions of the engine prior to acceleration.

(Car Body Vibration Suppression System)

The overall arrangement of the car body vibration suppression system according to the first and second embodiments will now be described with reference to FIGS. 1 through 3.

Figure 1:
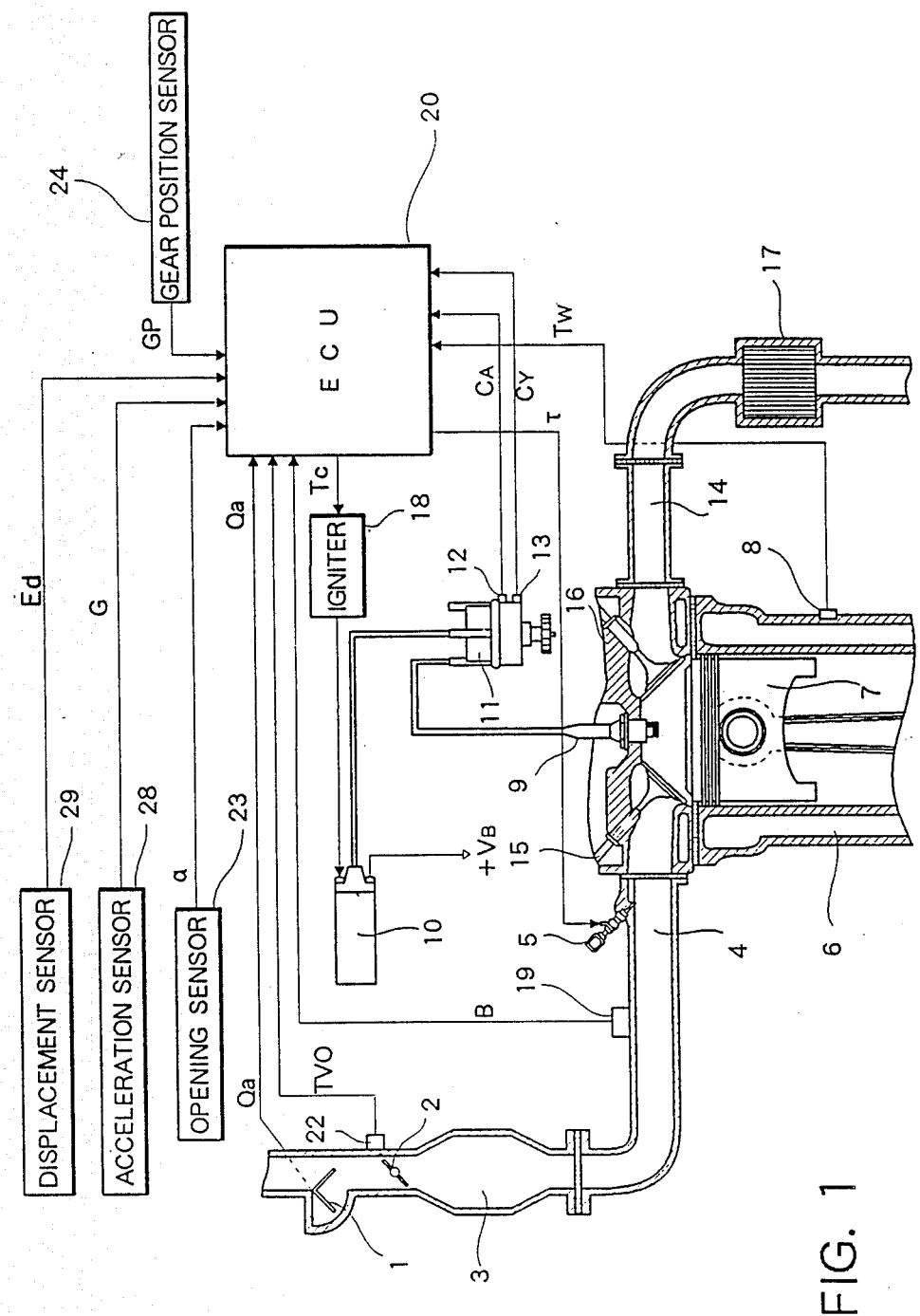
FIG. 1 is an overall view showing an engine vibration suppression system according to first and second embodiments of the present invention.

FIG. 1 is an overall view of a four-cylinder fuel injection engine. Portions particularly relating to these embodiments are an airflow meter 1 for measuring the amount of intake air, a throttle valve 2 for regulating the amount of intake air, an intake manifold 4, an injector 5 for injecting fuel, a temperature sensor 8 for sensing coolant temperature, a spark plug 9, an ignition coil 10, a distributor 11 for sensing engine rotational speed and rotation angle an exhaust manifold 14, an intake valve 15, an exhaust valve 16, an igniter 18 for supplying the ignition coil 10 with an igniting current, a boost pressure sensor 19 for detecting pressure B inside the intake pipe, an engine control unit (ECU) 20 for executing overall control of the engine, an opening sensor 22 for sensing the opening (TVO) of the throttle valve 2, an opening sensor 23 for sensing accelerator opening, a position sensor 24 for sensing the gear position (GP) of a transmission (not shown), an acceleration sensor 28 for sensing car body vibration and providing an output signal G, and a displacement sensor 29 for detecting engine displacement and providing an output signal $E_d$. It should be noted that the output signal G from the acceleration sensor 28 is used in control for suppressing car body vibration performed in the second embodiment, but not in control for suppressing car body vibration performed in the first embodiment.

The amount $Q_a$ of intake air is measured by the airflow meter 1. While the amount thereof is regulated by the throttle valve 2, the intake air is introduced to the combustion chamber of an engine body 6 through a surge tank 3. Gasoline is injected from the injector 5. Injection time is decided by a pulse signal $\tau$ outputted by the ECU 20. The combusted mixture is released into the atmosphere through an exhaust manifold and a catalytic converter 17.

A crank angle signal $C_A$ from a crank angle sensor 12 of the distributor 11 and a cylinder signal $C_Y$ from a cylinder sensor 13 are outputted to the ECU 20 every revolution of the engine and are utilized for cylinder discrimination and synchronization of engine rotation.

A high-voltage secondary current induced by the ignition coil 10 is supplied to the spark plug 9 via the igniter 18, whereby the spark plug 9 produces a spark to ignite the mixture. Provided within the igniter 18 is an advance angle circuit (not shown) which, upon receiving a signal $T_c$ from the ECU 20, changes the cut-off timing of the primary current of ignition coil 10 to adjust the magnitude of the advance angle of ignition timing.

Figure 2:
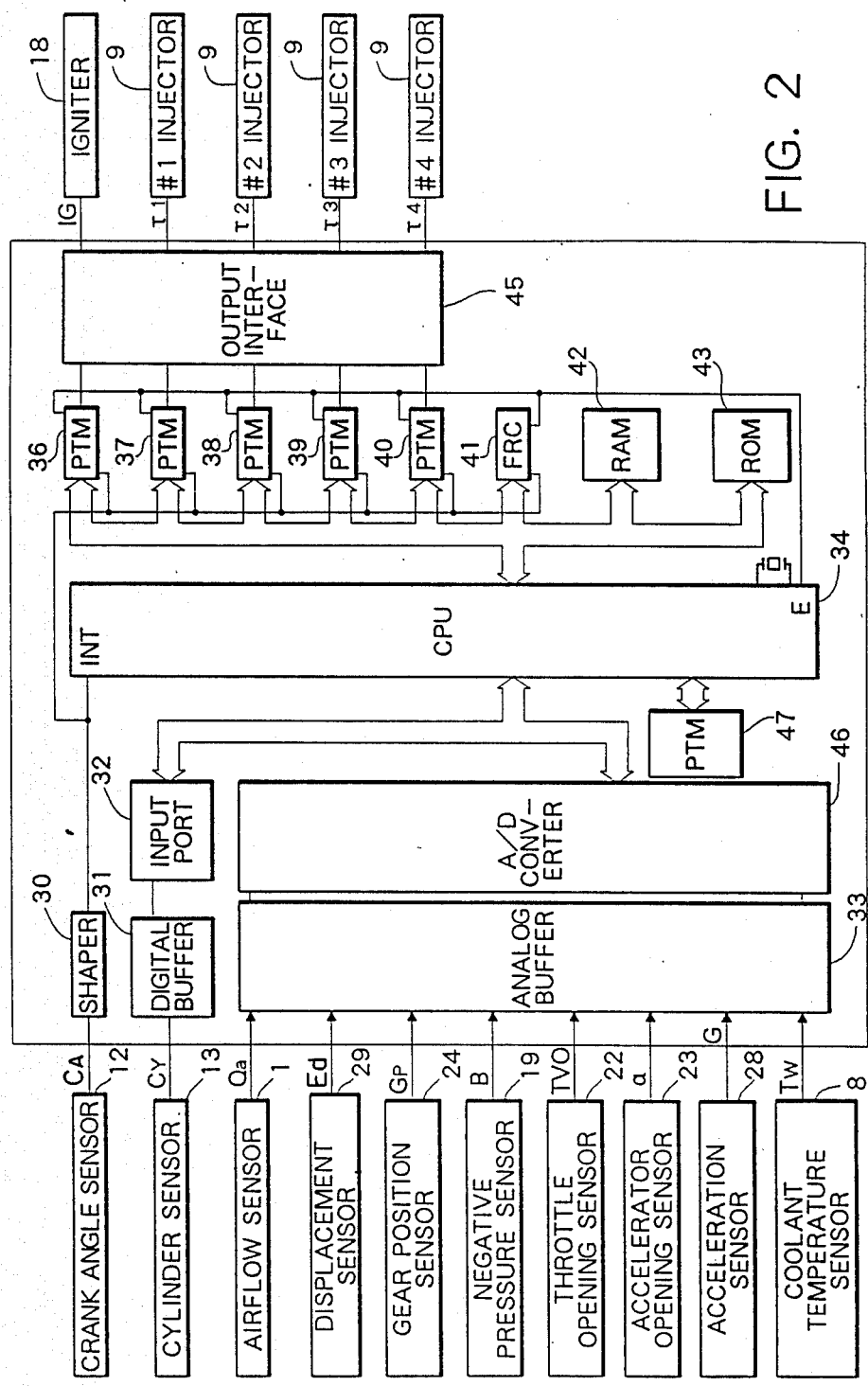
FIG. 2 is a view showing the internal construction of an engine control unit (ECU) used in the first and second embodiments.

FIG. 2 is a view showing the internal structure of the ECU 20 and the connections between the ECU 20 and the various sensors. As shown in FIG. 2, the crank angle signal $C_A$ is inputted to an interrupt terminal of a CPU 34 through a waveform shaping circuit 30. The signal $C_A$, which is a rotational angle signal indicating an angle of 45° C. before TDC, is represented by BTDC 45°. When this signal enters the CPU 34, an interrupt routine is called and a computation, such as for computing engine rotational speed, is carried out. The signal $C_Y$ from the cylinder sensor 13 is inputted to the CPU 34 via a digital buffer 31 and an input port 32.

Analog signals indicative of the boost pressure B, amount of intake air $Q_a$, acceleration G and the like are sent through an analog buffer 33 and converted into digital values by an A/D converter 46. These digital values are applied to the CPU 34. Numerals 36 through 40 denote programmable timers (PTM's). Numeral 45 denotes an output interface circuit for interfacing signals between igniter 18 and injectors 9. The items of data set in these PTM's 36 through 40 are, from top to bottom in the order mentioned, ignition timing $I_G$ and four fuel injection pulses $\tau_1$ through $\tau_4$ for respective ones of four cylinders. The clock signals for these PTM's are supplied by a freely counting counter (FRC) 41.

A ROM 43 stores a control procedure program such as the flowcharts described hereinbelow. A RAM 42 is used in order to temporarily preserve intermediate data necessary for control.

Figure 3:
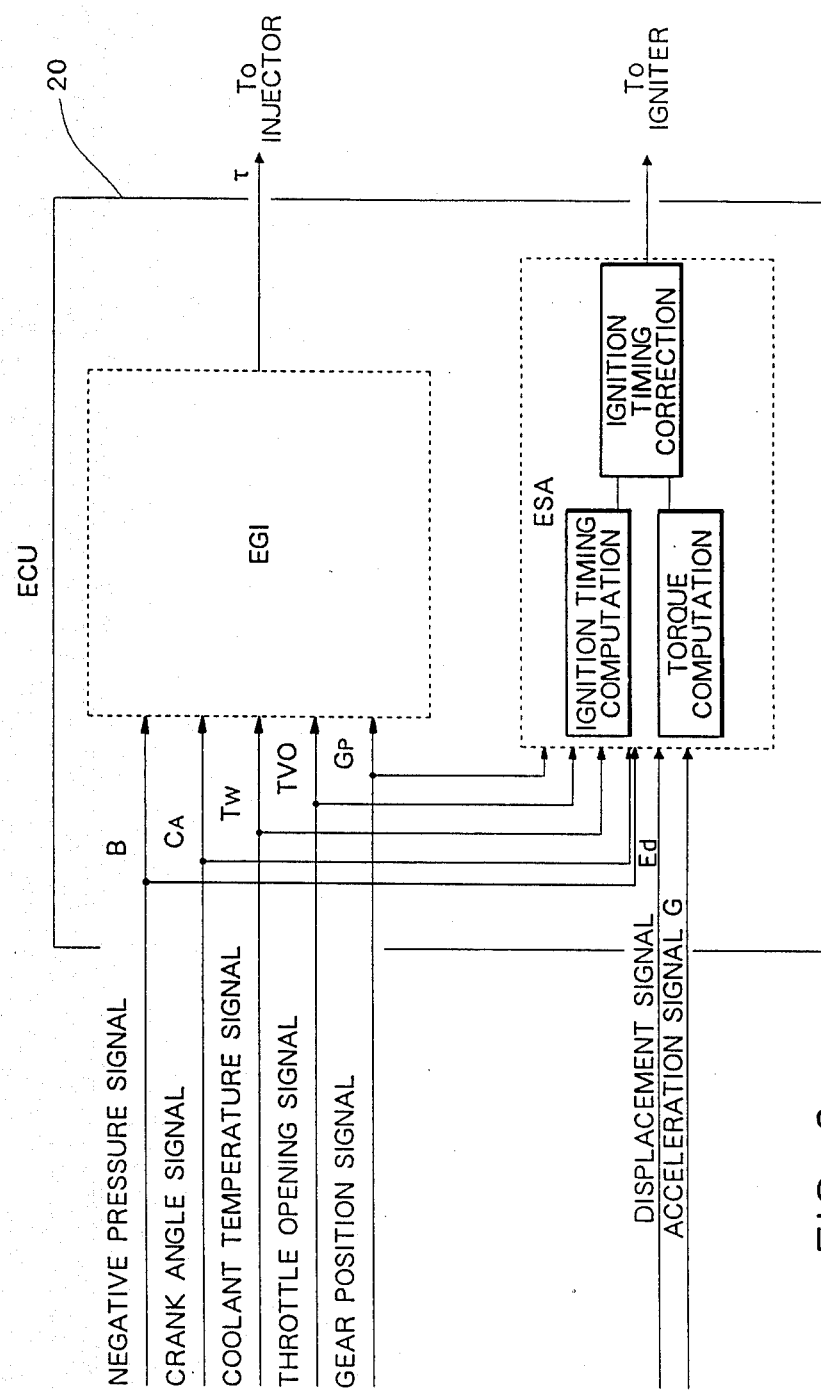
FIG. 3 is a functional block diagram of engine control performed by the ECU of the first and second embodiments.

FIG. 3 is a functional block diagram of engine control performed by the ECU 20. An EGI section, which receives input information composed of signal B indicative of the negative pressure of intake air, engine rotational speed data, a signal (air/fuel ratio) from an $O_2$ sensor (not shown), the throttle opening signal TVO and the coolant temperature signal $T_W$, is adapted to execute fuel injection control (air/fuel ratio control) by changing the pulse width $\tau$ of the injector 5. An ESA section includes a requested ignition timing computation block, a requested torque computation block and an ignition timing correction block. The ESA section, which receives input information composed of the signal B indicative of the negative pressure of intake air, the engine rotational speed data, the throttle opening signal TVO, the coolant temperature signal $T_W$, the gear position signal GP and the signal G indicative of car body acceleration G, is adapted to adjust the advance angle of the advance angle circuit in igniter 18 in order to change the cut-off timing of the primary current of ignition coil 10, thereby executing ignition timing control for controlling the engine output torque.

(First Embodiment)

Figure 4:
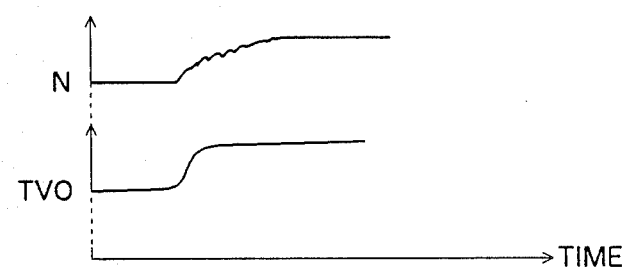
FIG. 4 is a graphic view showing, in macro terms, the manner in which engine rotational speed N changes from the start of acceleration.
Figure 5:
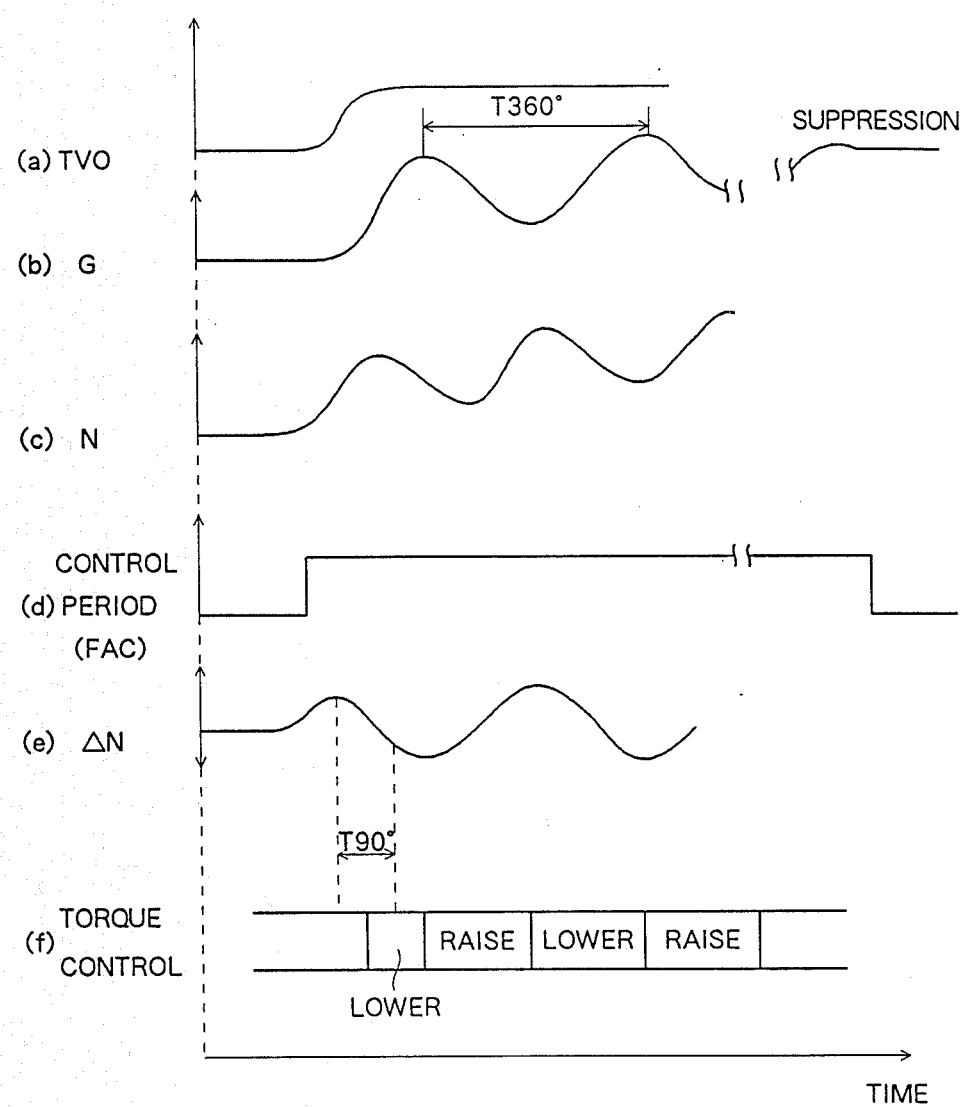
FIG. 5 is a graphic view useful in describing the phase relationship between car body vibration and torque control for suppressing this vibration in the first embodiment.
Figure 6:
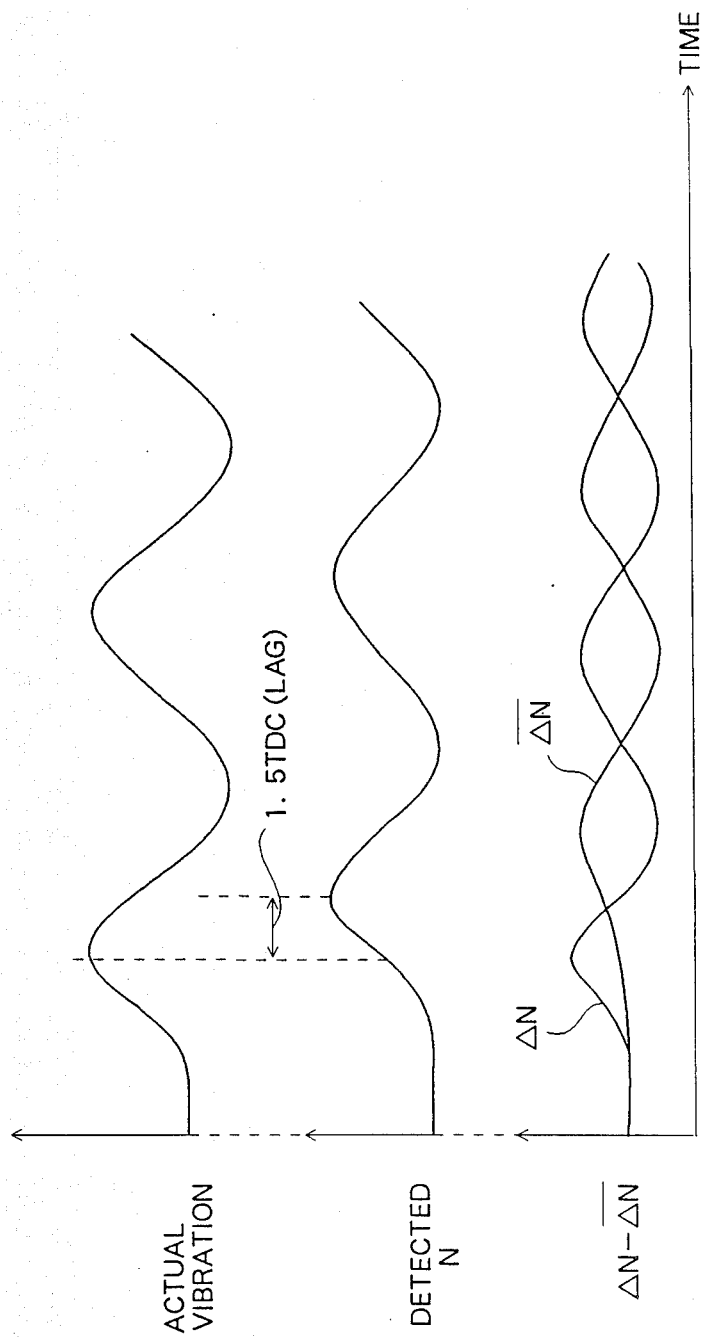
FIG. 6 is a graphic view useful in describing the manner in which a control delay occurs in the first embodiment.

The general features of torque control in the first embodiment will now be described with reference to FIGS. 4, 5 and 6. FIG. 4 illustrates, in macro terms, the change in engine rotational speed N when the throttle valve 2 is opened (TVO represents the throttle opening) by stepping down on the accelerator pedal. FIG. 5 illustrates engine rotational speed N and the like in micro terms.

As long as the state of the drive system, such as the gear ratio, for example, does not change, the period of car body vibration (represented by the acceleration G) essentially does not fluctuate, as shown at (b) in FIG. 5. In other words, though there is a change in the amplitude of vibration, there is no change in the period of vibration, depending upon the type of vehicle or to the elapsed time of vibration. When car body vibration occurs, torsion develops in the drive system. This torsion appears as a fluctuation in the rotational speed N. This means that car body vibration can be indirectly detected as a fluctuation $\Delta N$ [FIG. 5(e)] in engine rotational speed N. Since car body vibration is a periodic variation, the fluctuation $\Delta N$ in rotational speed has the same period [FIG. 5(e)] as the car body vibration, amplitude and phase difference aside. Accordingly, $\Delta N$ is the most suitable information for suppression of vibration. By subjecting this information to appropriate information processing and effecting a conversion into an advance angle/delay angle quantity $\Delta I_G$ of ignition timing $I_G$, torque control for suppression of vibration is carried out.

It will suffice if the characteristic of control for varying engine torque is implemented at a phase opposite that of the car body vibration period. In this case, rather than making the characteristic of control for varying torque exactly opposite in phase with respect to the vibration period (i.e., displaced in phase by 180° with respect to the vibration period), vibration can be suppressed more effectively if control is carried out so that the output torque is gradually decreased when the phase is such that the acceleration gradually increases and is gradually increased when the acceleration G gradually decreases [FIG. 5(f)]. More specifically, in order to effect control so as to gradually decrease output torque when the phase is such that acceleration gradually increases and gradually increase output torque when acceleration gradually decreases, it is advantageous in terms of phase to utilize an amount obtained by retarding the characteristic of the engine rotational speed fluctuation $\Delta N$ by one-quarter the period. In other words, the period of torque control is made to agree with the period $T_{360°}$ (=the period of vibration) of $\Delta N$, and the following phase difference is applied with respect to the rotational speed fluctuation $\Delta N$:

$$T_{90°} = \text{phase difference} = \text{vibration period}/4 \tag{1}$$

Since engine rotational speed basically is a "rising" curve at the time of acceleration, it is necessary to detect only the amount of change in this speed.

Accordingly, in the first embodiment, a DC component $\Delta \overline{N}$ (the average value of $\Delta N$) is subtracted from the fluctuation $\Delta N$ in engine rotational speed in order to perform torque control in a highly accurate manner. More specifically, an amount obtained by retarding the characteristic $\Delta N - \Delta \overline{N}$ by one-quarter the period is utilized in order to perform control in such a manner that torque is gradually decreased when the phase is such that acceleration gradually increases, and is gradually increased when the phase is such that acceleration gradually decreases.

Since torque control is realized by controlling ignition timing, an ignition timing correction factor $$\Delta I_G^* = K_G \times (\Delta N_0 - \Delta \overline{N})$$

is computed every control cycle of the engine and is indexed and stored in memory. In other words, the $\Delta I_G$ thus obtained is stored in memory over the past n times in the form $\Delta I_G^*(1),$
$\Delta I_G^*(2),$
.
.
.
$\Delta I_G^*(n)$
Then,
$$\Delta I_G(m) = K_G \times (\Delta N_0 - \Delta N) \tag{2}$$

is adopted as the ignition timing correction factor $\Delta I_G(m)$ necessary for suppression vibration at any point in time, an m is adopted as an index number for obtaining $\Delta I_G$ found in the past control cycle. More specifically, torque control of a phase difference $T_{90°}$ is carried out using $\Delta I_G(m)$ found in a past control cycle corresponding to this phase difference.

The foregoing is the basic technique for torque control in the first embodiment. However, in order to perform control even more accurately, the concept of a "control delay time" described hereinbelow is introduced and torque control advanced (returned) in terms of phase by an amount corresponding to this "control delay time" is carried out. That is, let the aforementioned m be expressed as follows:

$$m = \frac{\text{vibration period}}{4} - \text{control delay time}$$

where control delay time=phase difference between actual rotational speed fluctuation and the computed $\Delta \overline{N}$ Since the computation of engine rotational speed is performed every TDC (top dead center), as will be described below, the occurrence of the "control delay time" is inevitable. Though $T_{90°}$, which is equal to one-quarter the vibration period, is a constant value if the gears are decided, the abovementioned "control delay time" contains an engine rotational speed detection delay and a delay equivalent to the time from ignition until the time that the engine torque changes. In other words, in a case where the fluctuation $\Delta N$ in engine rotational speed is detected, the detected (computed) $\Delta N$ is detected upon being delayed by the "control delay time" from the engine rotational speed fluctuation ascribable to the car body vibration G which actually arises. Therefore, this "computed $\Delta N$" corresponds to the "actual rotational speed fluctuation $\Delta N$" advanced by the "control delay time". For these reasons, it is necessary to subtract the "control delay time" from "vibration period"/4 to advance the torque control phase ahead of the "vibration period"/4 by the "control delay time".

This "control delay time" will now be pursued in the case of a four-cylinder-four-cycle engine in greater detail. In accordance with the abovementioned fundamentals of torque control, it is necessary to compute the engine rotational speed N, $\Delta N$ and $\Delta \overline{N}$ in order to control torque. If the engine rotational speed N is computed every TDC period, the "control delay time" based on computation of engine rotational speed N is 0.5 TDC For the same reason, the "control delay time" based on computation of the rotational speed fluctuation $\Delta N$ is 0.5 TDC If the averaging for the average value $\Delta \overline{N}$ of the rotational speed fluctuation is performed by taking a running average over, e.g., two revolutions (i.e., 4 TDC), the "control delay time" based on computation of the average value is 1.5 TDC In general, in the case of a four-cylinder engine, the "control delay time" when taking a running average over n revolutions is $[0.5+(n-1)]$ TDC The "delay" from ignition until actual torque generation is 0.5 TDC This delay depends upon the explosive combustion rate of the engine.

If these delay times are gathered together, the total "control delay time" from computation to ignition and from ignition to torque generation will be 3.0 TDC When the "control delay time" $T_{CR}$ is transformed from TDC unit to time unit it will be given by the following equation:

$$T_{CR} = 1.5 \times \frac{60,000}{N} \text{ ms} \tag{3}$$

In this embodiment, from among the values of $\Delta I_G^*$ found in the past and stored in memory, a past value which is "old" by the amount $$T_R = T_{90°} - TCR \text{ (ms)} \tag{4}$$

is extracted for use. In general engine control using a digital computer, the abovementioned control variable is stored at a fixed time interval. Therefore, if this time interval is made 5 ms, as in the program described below, the index m best suited to torque control is $$m = \frac{T_{90°} - TCR}{5} \text{ times} \tag{5}$$

FIG. 7 is a view in which resonance frequency of vibration, phase difference $T_{90°}$ and the like at each gear position (GP) are shown in the form of a table. In Eq. (5), $T_{90°}/5$ is obtained by looking up this table. Since $T_{CR}$ changes depending upon the engine rotational speed N, as indicated by Eq. (3), $T_{CR}$ is calculated in each control cycle.

Since the ignition period becomes longer the lower the rotational speed of the engine, the "control delay time" also becomes longer the lower the engine rotational speed. The abovementioned delay time $T_R$ is $$T_R = T_{90°} - T_{CR}$$

In view of Eq. (3), torque control in accordance with the first embodiment becomes impossible in an engine rotational speed region where $T_R$ becomes negative at a certain gear position GP, namely where the following holds at a certain gear position GP:

$$T_{90°} < 1.5 \times \frac{60,000}{N} \tag{6}$$

This is because the fact that the delay time $T_R$ becomes negative means that torque control at the present time will be performed based on a future control variable $(\Delta \overline{N} - \Delta N)$. More specifically, in a region where the engine rotational speed is such that $T_R < 0$ holds, car body vibration will not be actually suppressed or it will increase even if torque control is carried out. In this case, therefore, when $T_R$ approaches minus $T_{90°}$, namely when the "control delay time $T_{CR}$" approaches $T_{180°}$, a hunting phenomenon, in which torque control is performed in a torque increasing direction when vibration is in the positive direction, manifests itself with control as exercised in the first embodiment. Here an engine rotational speed $N_{MIN1}$ as in $$T_{CR} = 2T_{90°} = T_{180°} = \frac{\text{vibration period}}{2} \tag{7}$$

or $$1.5 \times \frac{60,000}{N_{MIN1}} = \frac{\text{vibration period}}{2} \tag{8}$$

shall be referred to as a "controllable minimum engine rotational speed (basic)". As shown in FIG. 7, this $N_{MIN1}$ changes depending upon the gear position.

An engine rotational speed $N_{MIN2}$ where the delay value $T_R$ becomes "0", namely where the following holds:

$$T_{90°} = 1.5 \times \frac{60,000}{N_{MIN2}} \tag{9}$$

shall be referred to as a "proper controllable minimum engine rotational speed". This is because control according to the first embodiment operates properly up to the region of $N_{MIN2}$. It will be noted that $N_{MIN2}$ also changes depending upon the gear position GP, as shown in Table of FIG. 7.

Thus, with sole control as performed in accordance with the first embodiment, it becomes necessary to take countermeasures for the time when the presently prevailing engine rotational speed N is less than the "proper controllable minimum engine rotational speed" $N_{MIN2}$. This is because the proper controllable minimum engine rotational speed $N_{MIN2}$ is a rotational speed region often used. In other words, the reason is that it becomes possible to effect control for suppressing vibration appropriately in a region [I] (the region above $N_{MIN2}$) shown in FIG. 8.

In the present invention, a situation in which the present engine rotational speed N is less than the "proper controllable minimum engine rotational speed" $N_{MIN2}$ is dealt with by control which is a modification of the first embodiment. This modification will be described after control in accordance with the first embodiment is discussed in detail.

Figure 9A:
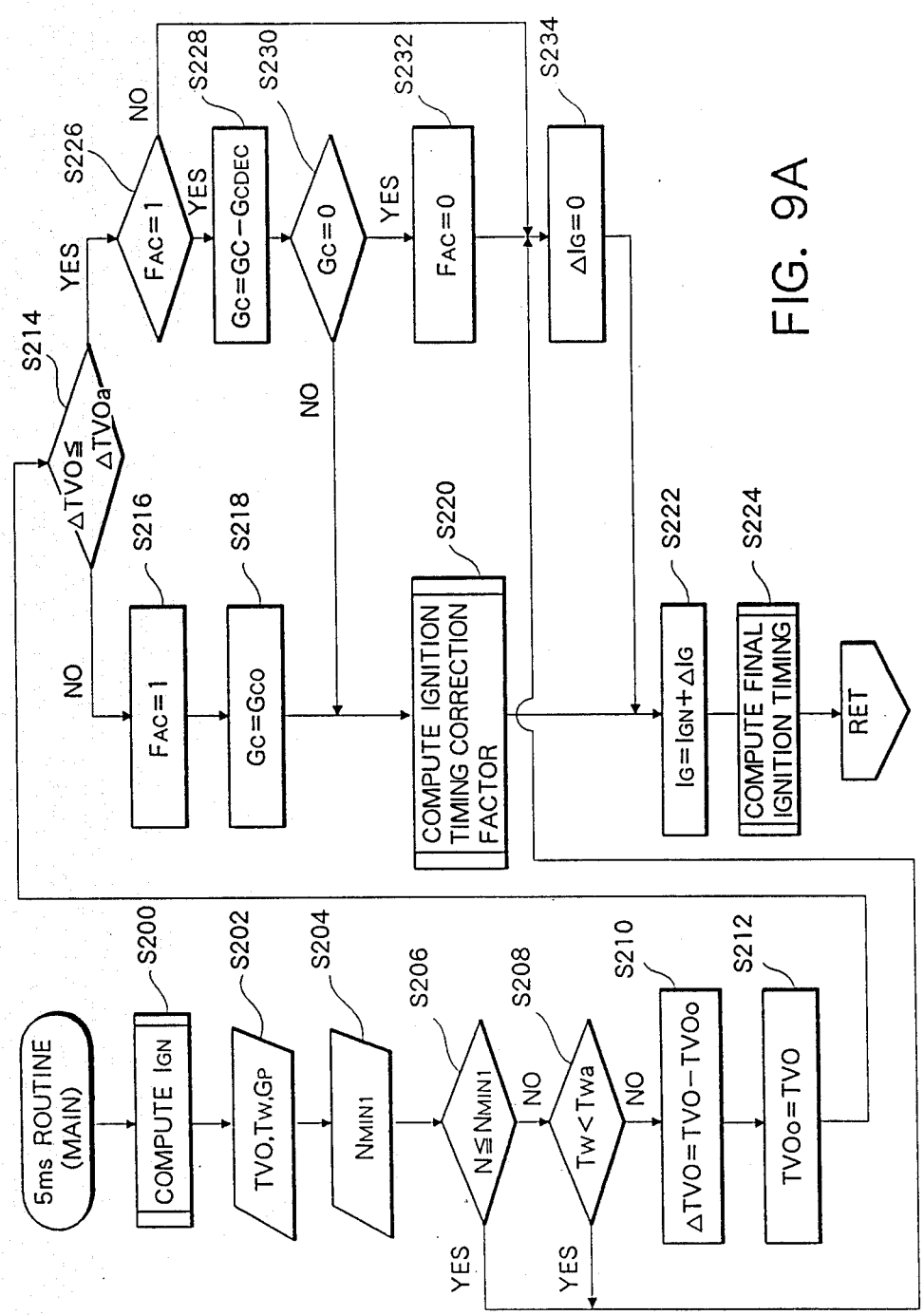
FIGS. 9A through 9D are control program flowcharts according to the first embodiment.
Figure 9B:
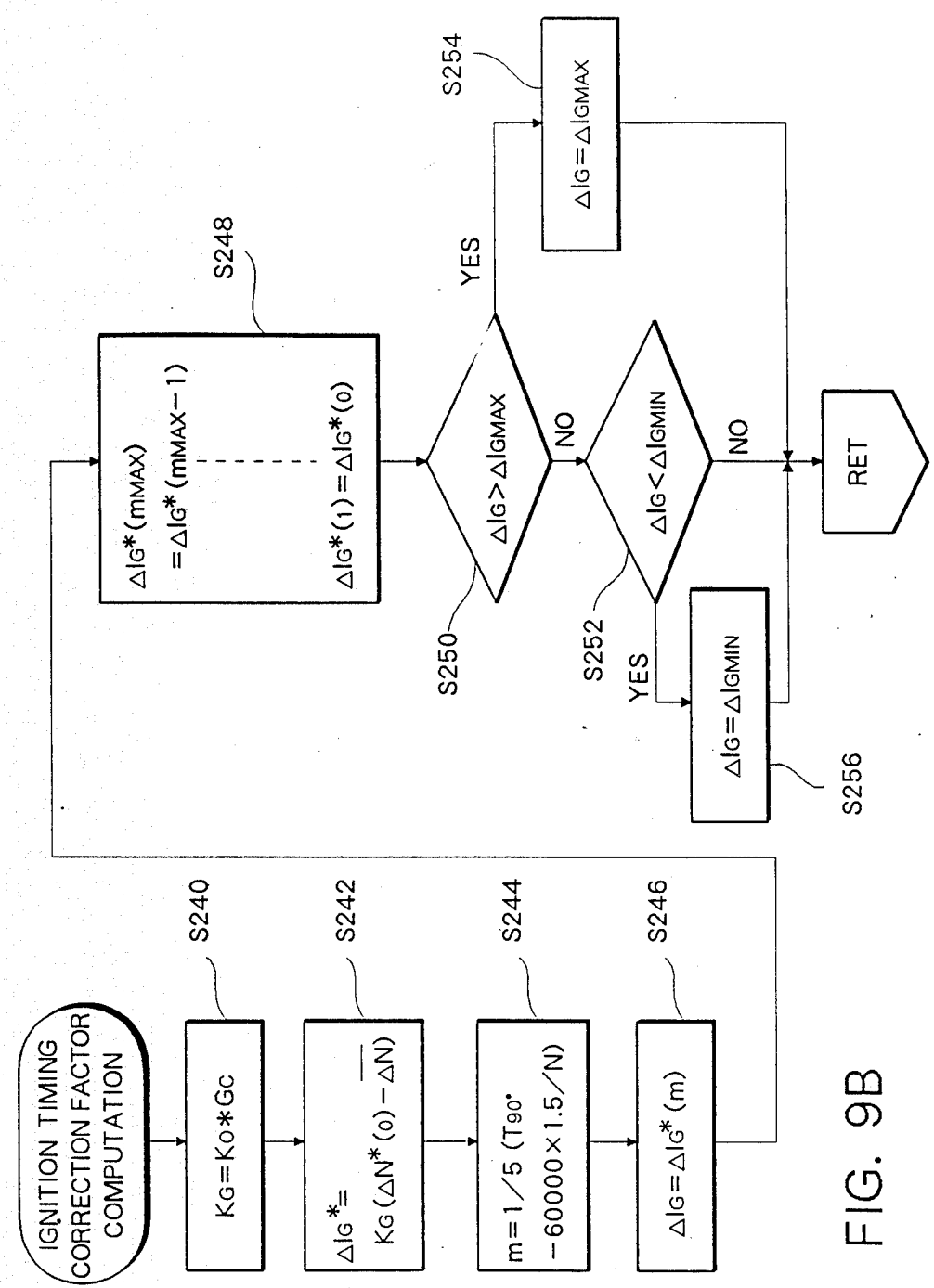
Figure 9C:
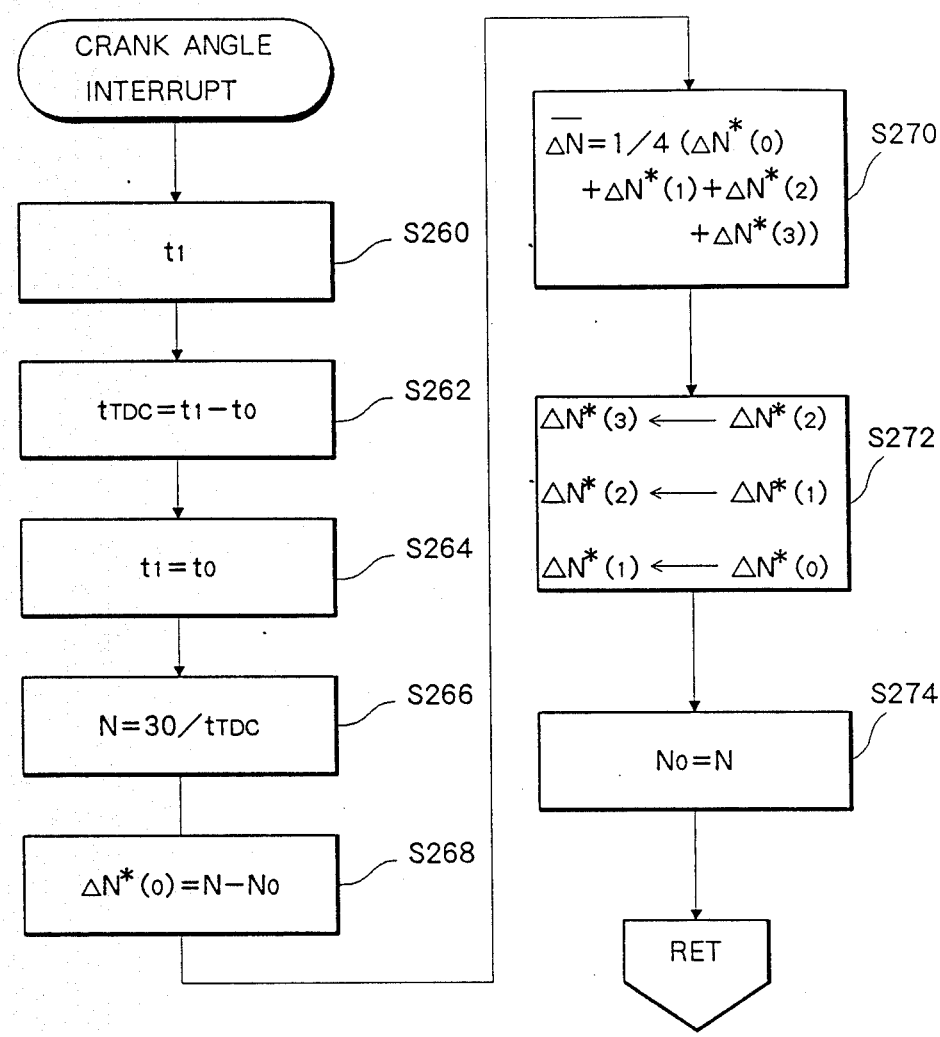
Figure 9D:
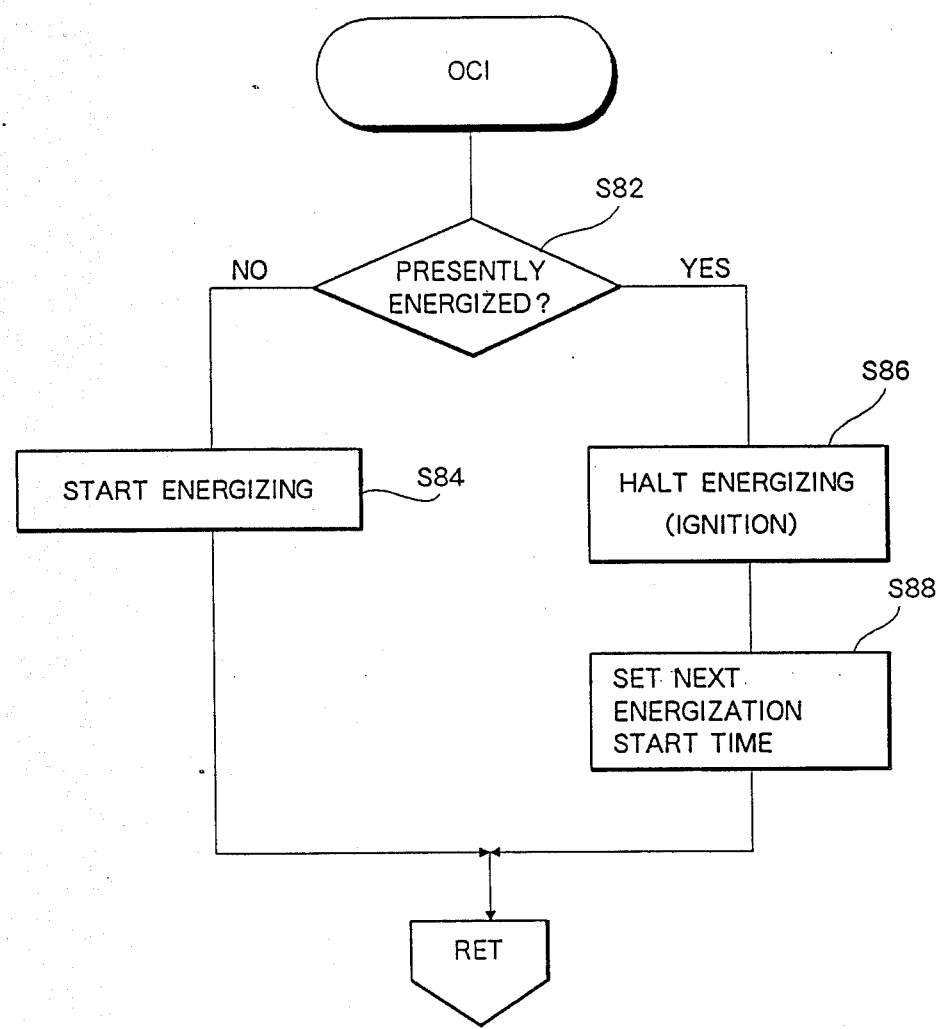

A detailed description of the first embodiment will now be given with reference to FIGS. 9A through 9D. FIG. 9A is a main routine of the ESA section started by an interrupt produced by the PTM 47 every 5 ms. FIG. 9B shows the details of computation (step S220) for the ignition timing correction factor $\Delta I_G$ in the main routine. FIG. 9C is a routine for computing engine rotational speed and fluctuation $\Delta N$ in engine rotational speed, the routine being started by an interrupt in response to the crank angle signal $C_A$ ($=45°$ before TDC). FIG. 9D shows an OCI (output compare interrupt) routine started by the PTM 36 for controlling ignition pulses applied to the igniter 18.

The crank angle signal interrupt routine of FIG. 9C will now be described. When the crank rotates up to a point 45° before TDC (BTDC 45°), the program proceeds to a step S260, at which the present time $t_1$ is read in from FRC 41. Next, at a step S262, the TDC period $t_{TDC}$ (the time required for one-half revolution of the crank) is computed in accordance with $$t_{TDC} = t_1 - t_0 \text{ (sec)}$$

from $t_1$ and the interrupt time $t_0$ computed at the moment of the last interrupt. This is followed by a step S264, at which the value of $t_1$ is saved as $t_0$ for the sake of the next interrupt. The program then proceeds to a step S266, at which the engine rotational speed N is computed in accordance with $$N = \frac{30}{t_{TDC}} \text{ (rpm)}$$

Next, at a step S268, a rotational speed fluctuation $\Delta N^*(0)$ between the engine rotational speed N computed in the last control cycle and the engine rotational speed $N_0$ presently computed is found from $$\Delta N^*(0) = N - N_0$$

As mentioned above, the "control delay" of 0.5 TDC is produced by this computation. In a step S270, four running averages $\Delta \overline{N}$ are found in accordance with $$\Delta \overline{N} = \frac{\Delta N^*(0) + \Delta N^*(1) + \Delta N^*(2) + \Delta N^*(3)}{4}$$

from $\Delta N^*(1)$ through $\Delta N^*(3)$ calculated and stored during the past 3 TDC times. A control delay time of 1.5 TDC is produced as a result of this computation. This is followed by a step S272, at which $\Delta N^*(1)$ through $\Delta N^*(3)$ are updated in order to compute the next $\Delta \overline{N}_4$.

A main routine started every 5 ms will now be described in accordance with FIG. 9A. This main routine is for computing the ordinary ignition timing $I_{GN}$, the ignition timing correction factor $\Delta I_G$ for carrying out vibration suppression at acceleration, and the final ignition timing $I_G$, namely $$I_G = I_{GN} + \Delta I_G$$

The final ignition timing $I_G$ is computed and outputted to the PTM 36 as pulse width.

A step S200 calls for computation of the ordinary ignition timing $I_{GN}$ in accordance with ordinary conditions. These ordinary conditions are the gasoline octane number, the amount of knocking produced, etc. This is followed by a step S202, at which the throttle opening TVO, engine coolant temperature $T_W$ and gear position GP, etc., are read in. Next, $N_{MIN1}$ described in connection with FIG. 7 is read in from a ROM or the like at a step S204. This is followed by a step S206, at which the engine rotational speed N and $N_{MIN1}$ are compared to determine whether the present operating region is a region in which hunting is produced. Since the region $N \leq N_{MIN1}$ is one in which hunting readily occurs due to torque control, the program proceeds to a step S234, at which torque control is halted. If engine coolant temperature $T_W$ is found to be less than a predetermined value $T_{wa}$ at a step S208, the program proceeds to the step same S234 to set $\Delta I_G$ to "0". The reason for this is that even when car body vibration occurs and it is necessary to correct the ignition timing $I_G$, retarding the ignition timing by carrying out torque control with the coolant temperature at a low value would result in the possibility of misfiring.

Steps S214 and S216 represent a procedure for detecting whether acceleration has started. Here $TVO_0$ denotes throttle opening obtained by the preceding control cycle. The start of acceleration is judged based upon whether $\Delta TVO$, which is the change in throttle opening over a period of 5 ms, is greater than a predetermined value $TVO_a$. If $\Delta TVO < TVO_a$ holds, this means that acceleration has not started. Accordingly, the program proceeds to a step S226, at which it is verified by checking the set state of a flag $F_{AC}$ whether control of acceleratory vibration is in effect. The reason for this is as follows: Even if the throttle opening change $\Delta TVO$ is small after the flag $F_{AC}$ has been set at the step S216 and the start of acceleration has been detected, acceleration is in effect for a fixed period of time [see FIG. 5(d)] and it is required that acceleratory vibration control be performed during this period of time. Consequently, the fact that control of acceleratory vibration is in effect is memorized. If this flag has not be set, the program proceeds from the step S226 to the step S234 to set $\Delta I_G$ to "0".

When the start of acceleration is sensed at the step S214, the program proceeds to the step S216, where the flag $F_{AC}$ is set, and thence to a step S218, at which a gain counter Gc is set to an initial value $G_{CO}$. This initial value G is a time period over which the flag $F_{AC}$ shown in FIG. 5(d) is to be set, namely a time period over which control for suppressing acceleratory vibration is to be carried out. This time period is that during which an ignition timing correction computation is executed at a step S220.

An ignition timing correction computation routine will now be described with reference to FIG. 9B. The object of this subroutine is to compute the ignition timing correction factor accordance with the abovementioned equation and carry out control for limiting the correction factor. First, control gain is computed in accordance with $$K_G = K_0 \times G_C$$

at a step S240. Since $G_C$ indicates a gradually decreasing characteristic, the control gain $K_G$ also indicates a gradually decreasing characteristic. It should be noted that the control gain $K_G$ may be a constant of $K_0$.

A step S242 calls for the ignition timing correction factor for memorization to be computed in accordance with $$\Delta I_G^* = K_G \times [\Delta N^*(0) - \overline{\Delta N}]$$

Next, at a step S244, an index number m advanced by the control delay time from one-quarter (i.e. $T_{90°}$) of the vibration period is obtained in accordance with the following equation:

$$m = \frac{1}{5} \cdot \left( T_{90°} - \frac{60{,}000 \times 1.5}{N} \right)$$

A step S246 calls for the ignition timing correction factor $\Delta I_G$ of index m to be searched from the $\Delta I_G^*(m)$ computed up to the last cycle and stored in the RAM 42. The map of $\Delta I_G^*(m)$ in memory 42 is updated at a step S248. Steps S254 and 256 are for ignition timing limit control.

Thus, car body vibration can be optimally suppressed by making positive use of the control delay time, which is inevitably produced by computing the engine rotational speed N, rotational speed fluctuation $\Delta N$ and the average value $\overline{\Delta N}$ thereof, in torque control for the purpose of suppressing vibration. In particular, by setting $N_{MIN1}$ at which hunting occurs in a low rotational speed region higher than the above and halting torque control in a region lower than the above, vibration can be prevented in reliable fashion.

It should be noted that the amount 1.5 TDC of the abovementioned control delay time in the case of a four-cylinder engine is the result of four running averages (step S270). Accordingly, in the case of a six-cylinder engine or the like, it will be necessary to modify the calculation equations whenever the number of running averages is changed. However, these modifications are self-evident from the foregoing explanation.

(Modifications of First Embodiment)

General Description of the Modifications

Two modifications of the first embodiment are illustrated.

Eq. (5) shows that $T_R$ is positive even if $T_{CR}$ becomes large in magnitude. In consequence, it will suffice to make TCR small or, conversely, make $T_{90°}$ large in a rotational speed region where $T_{CR}$ becomes large. Control for achieving the former is the first modification, and control for achieving the latter is the second modification. In the second modification, since $T_{90°}$ is fixed as long as the gear position is fixed, use is made of $$T_{450°} = T_{360°} + T_{90°}$$

instead of $T_{90°}$. $T_{450°}$ is the result of an additional delay of one period from $T_{90°}$.

First Modification of the First Embodiment

In order to make $T_{CR}$ small in Eq. (5) in such a manner that $T_R$ will not become negative, $T_{CR}$ is generated by an averaging computation primarily when obtaining the average engine rotational speed $\bar{N}$. Accordingly, it will suffice to change the number of running averages depending upon the value of the engine rotational speed. In this way the control delay time can be adjusted and the phase lag of the change in engine torque can be held to the minimum. More specifically, control according to the foregoing embodiment is modified in such a manner that a running average over two revolutions of the engine is taken in the region below the $N_{MIN2}$ line in FIG. 8, just as in control according to the foregoing embodiment, in order to compute $\Delta N$, and such that a running average over one revolution is taken in other regions. Since one revolution of the engine corresponds to a period of 2TDC, four N's are sampled in the two-revolution running average and, as in the step S270 of the foregoing embodiment, use is made of $$\Delta \bar{N}_4 = \frac{\Delta N^*(0) + \Delta N^*(1) + \Delta N^*(2) + \Delta N^*(3)}{4}$$

Similarly, $$\Delta \bar{N}_2 = \frac{\Delta N^*(0) + \Delta N^*(1)}{2}$$

in the one-revolution running average. In the running average taken over two revolutions, the "control delay time" is 1.5 TDC, just as in control according to the first embodiment. In the running average taken over one revolution, however, the "control delay time" is 0.5 TDC; the latter control delay time is 1 TDC shorter. Thus, shortening $T_{CR}$ by 1TDC in the low rotational speed region is effective in suppressing vibration in the low rotational speed region, particularly in region [II] of FIG. 8.

Since $T_{CR}$ in the low rotational speed region is 0.5 TDC, an engine rotational speed $N_{MIN3}$ as in $$T_{180°} = 0.5 \times \frac{60,000}{N_{MIN3}}$$

indicates the minimum rotational speed controllable by the first modification, similar to the case of the foregoing embodiment. It will be understood that since $N_{MIN3}$ underlies $N_{MIN1}$ in accordance with this modification, the controllable region is greatly improved.

Control according to the first modification will now be described in detail with reference to FIGS. 10A through 10C. Steps S340 through S348 are the same as steps S260 through 268 in FIG. 9C. Step S350 calls for $N_{MIN2}$ conforming to the gear position to be read in, and step S352 calls for the present operating region N and $N_{MIN2}$ to be compared. In the region $N \geq N_{MIN2}$, the running average $\Delta \bar{N}_4$ over two revolutions is computed at a step S358. In the region $N < N_{MIN2}$, the running average $\Delta \bar{N}_2$ over one revolution is computed at a step S354.

Figure 10A:
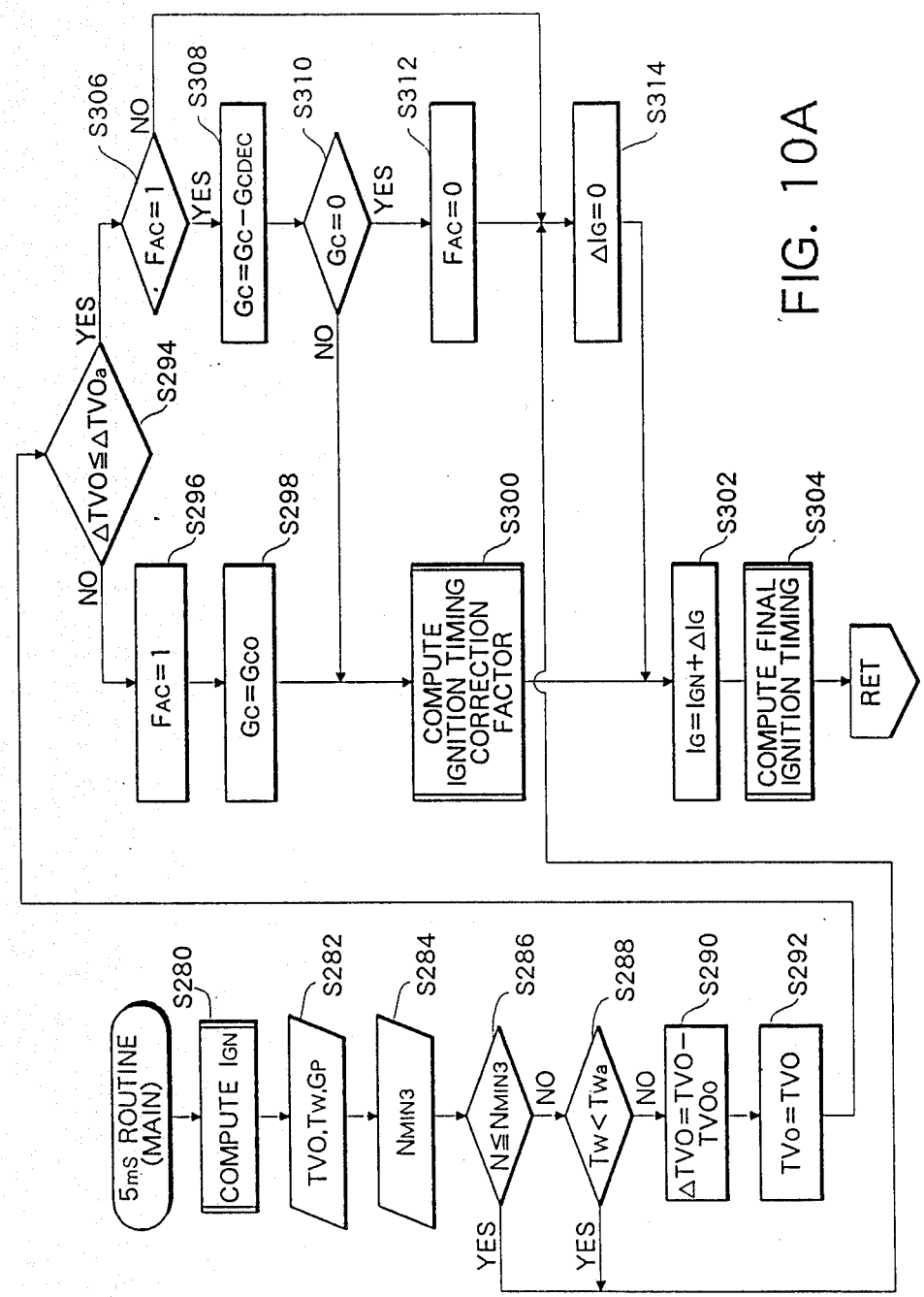
FIGS. 10A through 10C are flowcharts showing control procedures according to a first modification of the first embodiment.
Figure 10B:
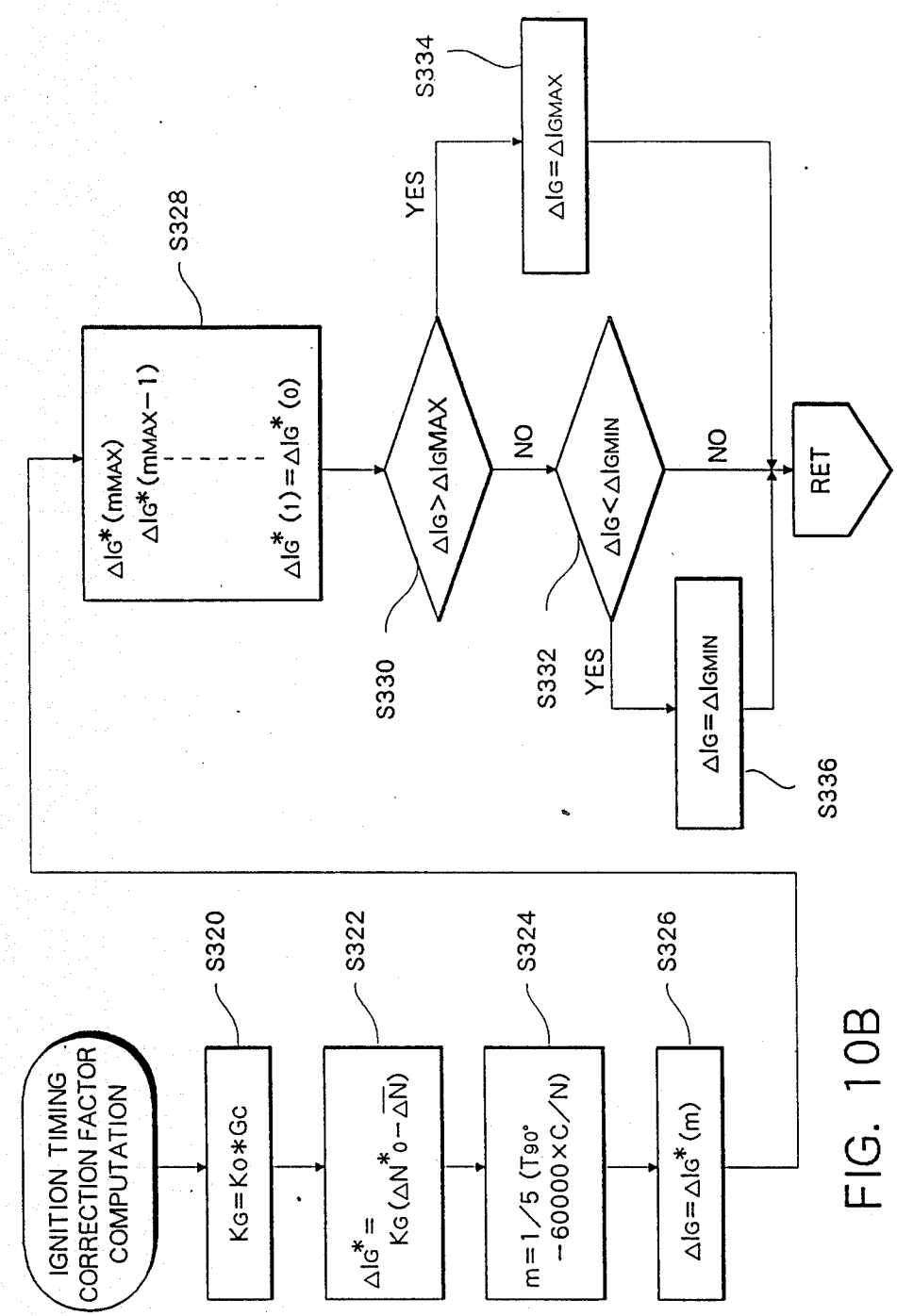
Figure 10C:
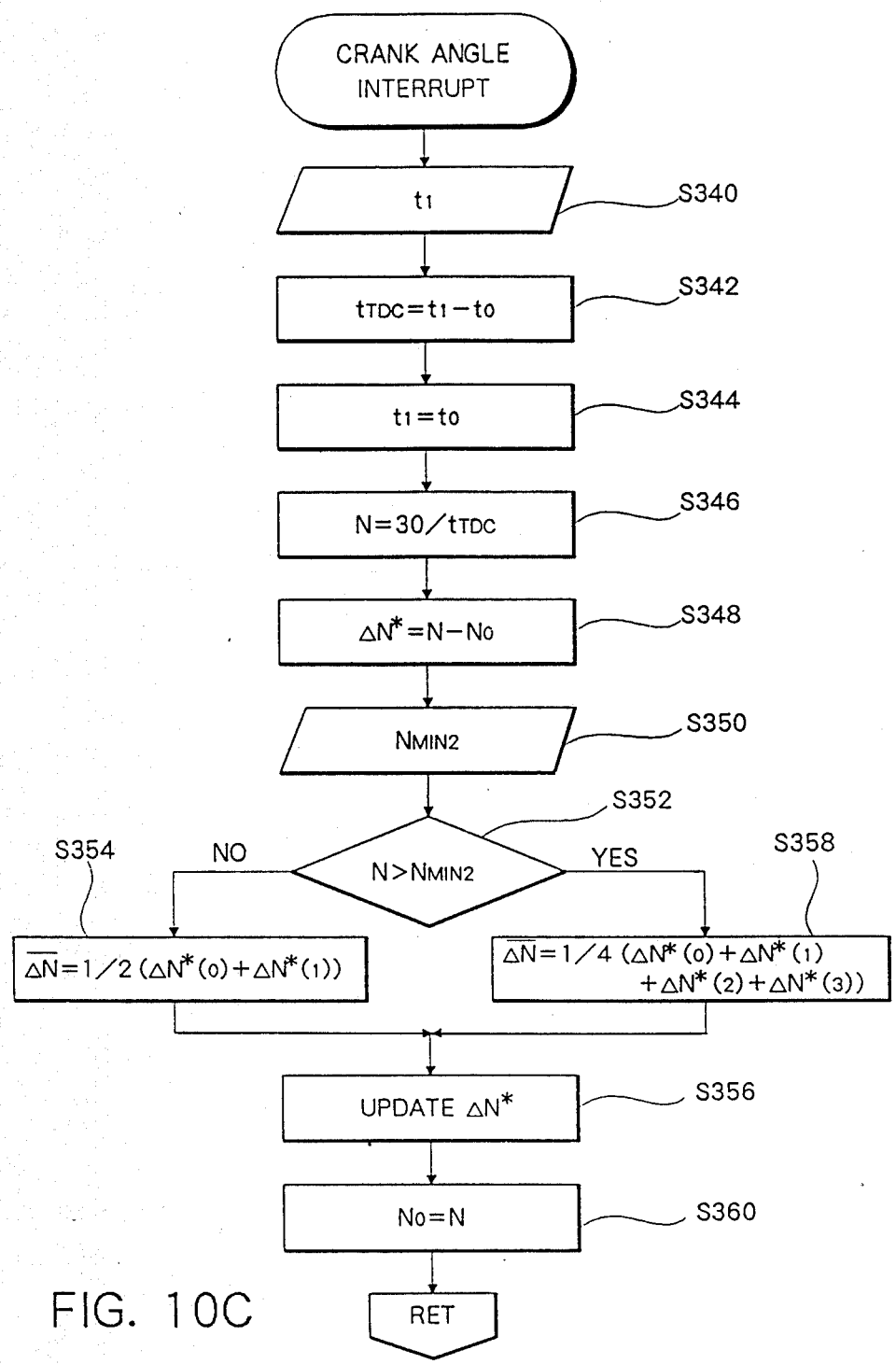

With regard to the main routine of FIG. 10A, $N_{MIN1}$ in steps S204 and S206 of FIG. 9A in the foregoing embodiment is replaced by $N_{MIN3}$ in steps S284, S286. The reason for this is that the controllable minimum rotational speed is modified to be lower in accordance with this modification. In FIG. 10B, the only difference from FIG. 9B is that step S324 differs from step S244. Specifically, with regard to C in the equation $$m = \frac{1}{5} \left( T_{90°} - \frac{60,000 \times C}{N} \right)$$

in step S324, four data running averages are taken in a region where the engine rotational speed is above $N_{MIN2}$. Therefore, C=1.5 in this region. In the rotational speed region below $N_{MIN2}$, two data running averages are taken, so that C=1. Control from step S326 onward is the same as in the first embodiment.

Thus, in the region $N_{MIN3} \leq N \leq N_{MIN2}$, the number of samplings of the running averages for $\Delta \bar{N}$ is reduced to reduce the control delay time. Hence, vibration is suppressed reliably without $T_R$ taking on a large negative value. In the region below $N_{MIN3}$, control for altering torque is halted, just as in the first embodiment. As a result, hunting does not occur.

When solely phase is taken into consideration, the smaller the number of running averages, the better. However, in order to eliminate manufacturing errors in a crank angle sensor of the type mounted on a crank camshaft, it is required to take a running average over two revolutions of the engine. Accordingly, it is preferred that a running average be taken over two revolutions of the engine to the extent possible.

Second Modification of the First Embodiment

Figure 8:
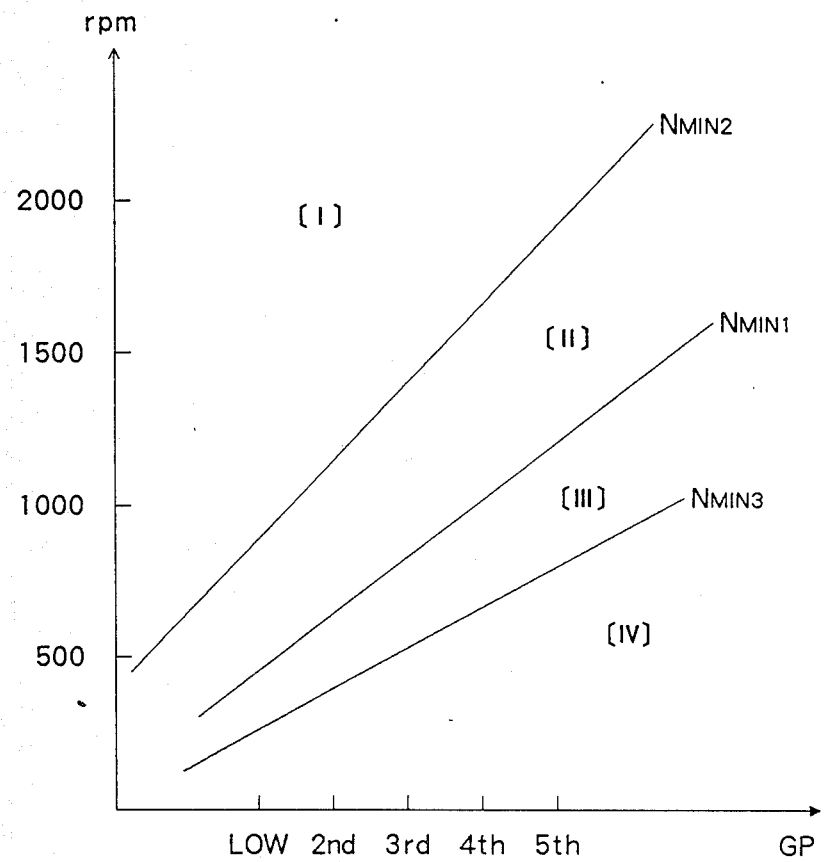
FIG. 8 is a graphic view in which operating regions of the first embodiment and the two modifications thereof are shown together.

According to the second modification, $T_{450°}$ is used instead of $T_{90°}$ in the equation $$m = \frac{1}{5} \cdot \left( T_{90°} - \frac{60,000 \times 1.5}{N} \right)$$

in an operating region below the $N_{MIN2}$ line of FIG. 8. With this arrangement, the period of car body vibration does not change, so that proper torque control better than the control of the first embodiment is possible in region [II] of FIG. 8.

Figure 11:
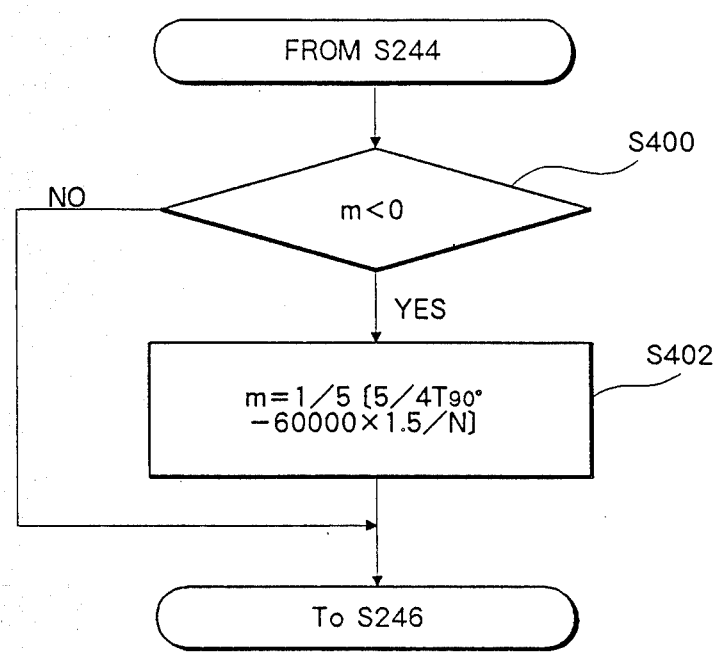
FIG. 11 is a flowchart in which only a control altering portion of a second modification of the first embodiment is extracted.

In the second modification, the control flowchart of the first embodiment is modified as shown in FIG. 11. Specifically, m is calculated at step S244 in FIG. 9B. At step S400 of FIG. 11, it is determined whether m will become negative, and m is calculated in accordance with the equation $$m = \frac{1}{5} \cdot \left( \frac{5}{4} \cdot T_{90°} - \frac{60,000 \times 1.5}{N} \right)$$

at step S402 only when m becomes negative. The program then returns to step S246 in FIG. 9B.

When this is done, m will not become negative. As a result, reliable torque control is possible and the riding comfort in the low rotational speed region is improved. However, since $T_{450°}$ is used instead of $T_{90°}$, suppression of the initial peak of vibration is difficult. It should be noted that it is also possible to reverse the sign of $\Delta I_G$ by a half-period shift instead of a single-period shift. In other words, it is possible to use $$m = \frac{1}{5} \cdot \left( \frac{3}{4} \cdot T_{90°} - \frac{60,000 \times 1.5}{N} \right)$$

and to adopt

-continued $$\Delta I_G = -\Delta I_G*(m)$$

(Other Modifications)

Though the above-described embodiment is for solving the problem of control delay time peculiar to digital computers, it is also applicable to analog computers since these computers possess a "detection delay".

In accordance with the first embodiment and modifications thereof, ignition timing is corrected as an expedient for varying engine torque. However, in order to attain the foregoing effects, it is permissible to correct the air/fuel ratio, the load of auxiliary equipment such as an alternator, EGR amount, throttle opening and the like.

Also, instead of adopting a fluctuation in engine rotational speed as an expedient for detecting car body vibration, it is possible to employ car body acceleration, a change in the rotating speed of the vehicle wheels, drive shaft torsion, engine displacement and the like.

It is also possible to employ intake air negative pressure B instead of the throttle opening TVO, accelerator opening α and the like as an expedient for sensing an acceleration request. In such case, however, since negative pressure B undergoes a large change with even a small accelerator opening when engine rotational speed is low, a correction based on engine rotational speed is required.

(Second Embodiment)

As described earlier in simple terms, this embodiment takes into account the fact that the amount of torque transfer delay in a mechanical system varies depending upon the operating conditions and is adapted to synchronize the timing of torque control and the timing of car body vibration by revising, in dependence upon the operating conditions prior to acceleration, the time at which torque control starts. In other words, when the engine is in a decelerating state before the start of acceleration, the moment of occurrence of the initial peak of front-and-rear vibration of the car body at acceleration is delayed much more than usual. Therefore, in order to make output fluctuation and the natural vibration of the drive system interfere with each other to rapidly reduce the front-and-rear vibration of the car body, the arrangement is such that the timing at which control starts is delayed by a predetermined value to bring it into substantial agreement with the timing at which car body vibration peaks.

The arrangement of the engine system of the second embodiment is the same as that of first embodiment shown in FIG. 1. Also, car body vibration is ascertained from the output G of the acceleration sensor 28. The operations conditions, such as whether the engine is in a steady state or decelerating state, is identified by the output of the engine displacement sensor 29.

Figure 12A:
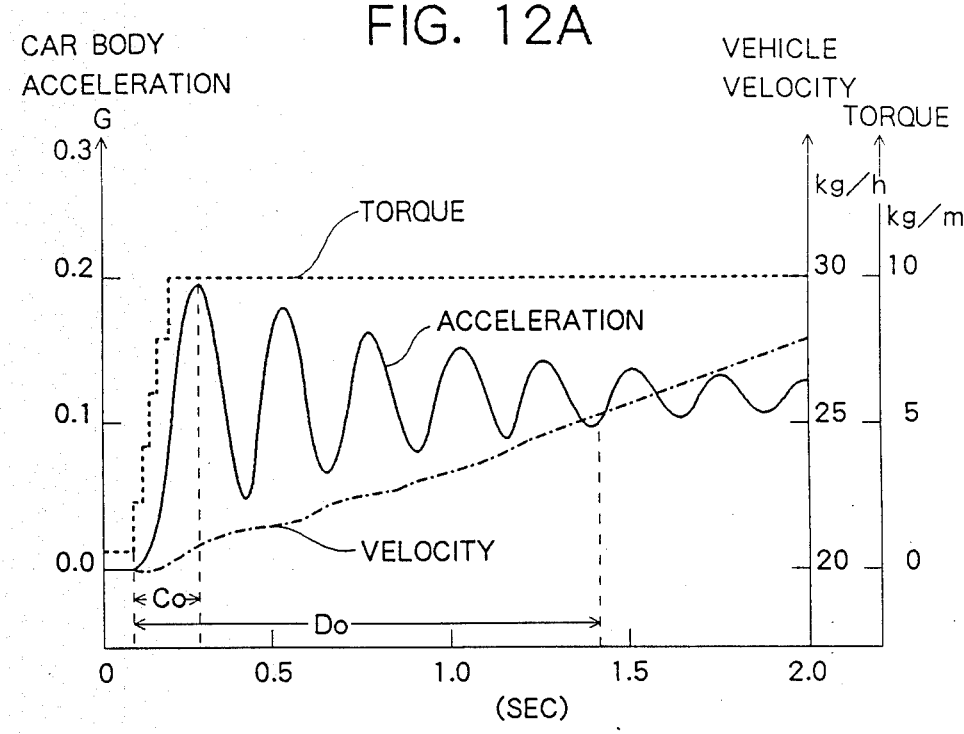
FIGS. 12A and 12B useful in describing a difference between a case where a control operation according to the second embodiment is not carried out and a case where the operation is carried out.
Figure 12B:
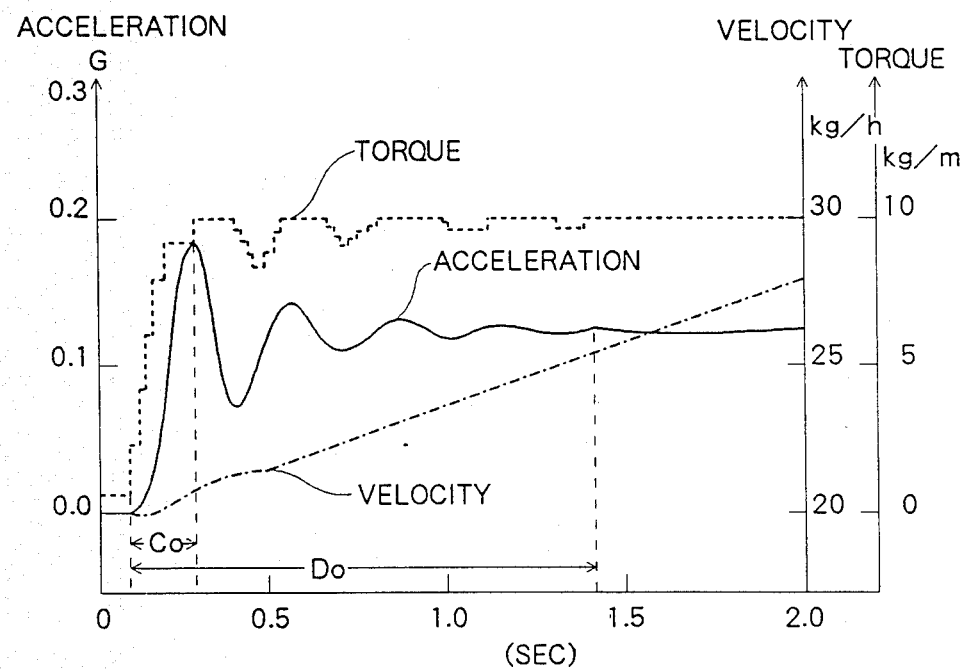

FIG. 12B is for describing the general control operation according to the second embodiment. As in the first embodiment, torque control is implemented by correcting ignition timing. As shown in FIG. 12B, the ignition timing correction factor $\Delta I_G$ is fixed at δ for a period of time $C_0$ following the start of acceleration, $\Delta I_G$ is matched with fluctuation $\Delta G$ of the degree of acceleration until elapse of time $D_0$ following $C_0$, and $\Delta I_G$ is made "0" upon elapse of $D_0$. As for examples of values of $C_0$, $C_0=0.3$ sec if the vehicle is accelerated from the decelerating state (for example, in the 3rd gear and 1500 rpm) and $C_0=0.25$ if the vehicle is accelerated from a state in which it is traveling at a steady velocity (for example, in the 3rd gear and 1500 rpm).

Figure 13A:
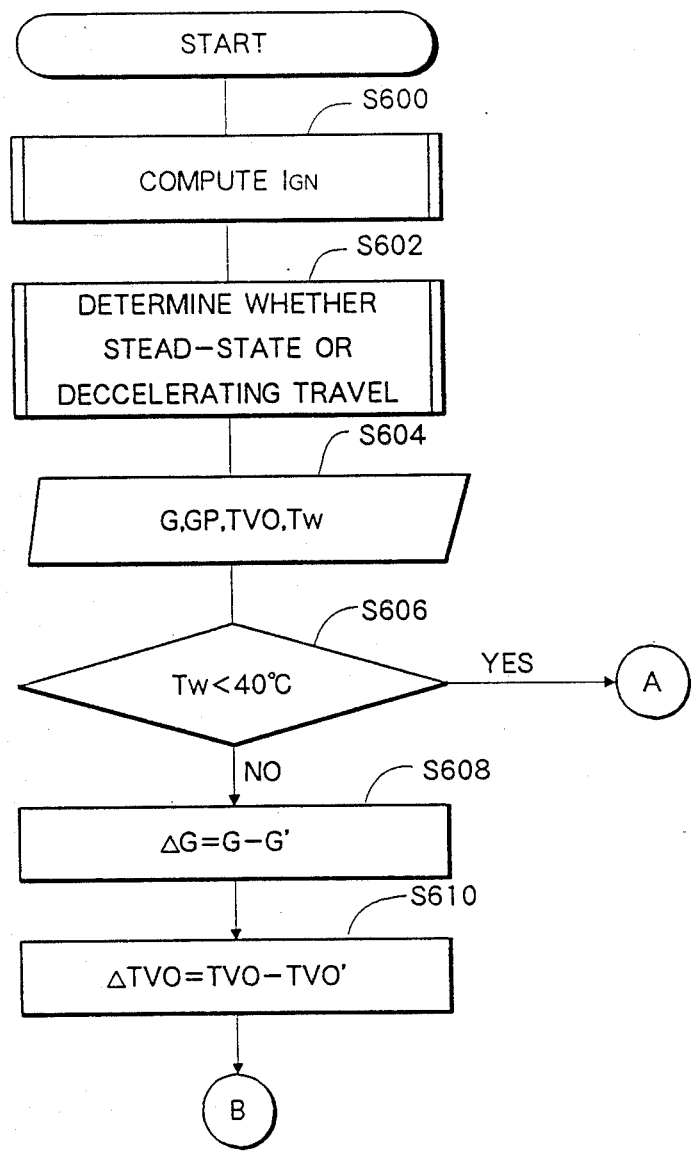
FIGS. 13A, 13B and 14 are control program flowcharts according to the second embodiment.
Figure 13B:
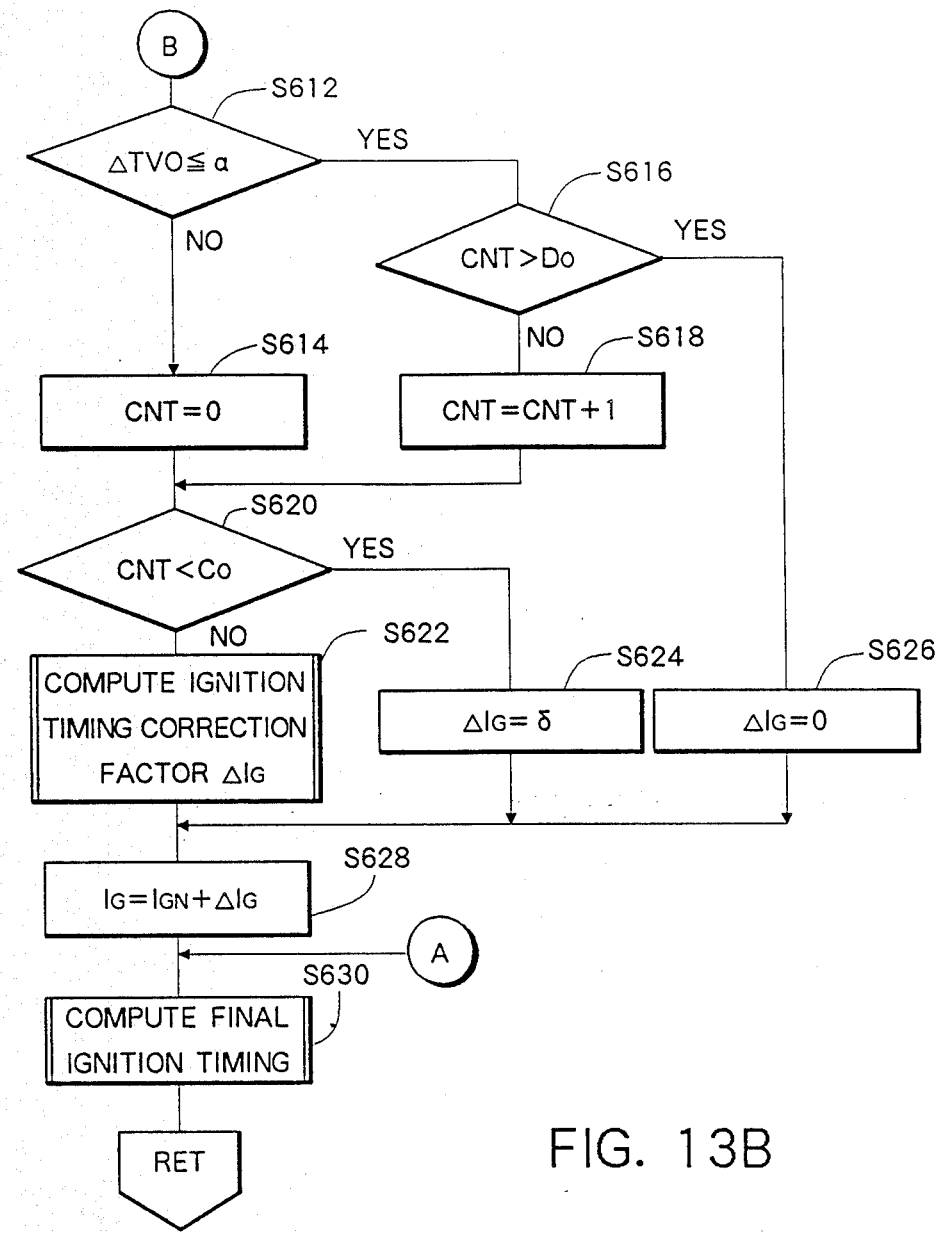

In the flowchart of FIG. 13A, the ordinary ignition timing computation of step S600 is the same as that of step S200 in FIG. 9A and therefore is no different from the well-known ordinary ignition timing computation. A step S602 calls for a determination as to whether the engine operating condition is indicative of the steady state or the decelerating state. This determination is made upon receiving, as input information, a displacement signal from the engine displacement sensor 29. The reason for this is that the engine is displaced slightly forward by its inertia at deceleration.

The car body acceleration G, the transmission gear position GP, the throttle opening TVO and the coolant temperature $T_W$ are read in at a step S604. It is determined at a step S606 whether the coolant temperature $T_W$ is less than 40° C. When the engine is cold, the operating conditions are unstable and engine output torque cannot be precisely controlled by controlling ignition timing. Therefore, according to the second embodiment, the arrangement is such that suppression of front-and-rear vibration of the car body is not performed when the engine is cold, even if the vehicle is being accelerated. If the result of the decision at the step S606 is NO, namely that $T_W>40°$ C. holds, the engine is hot. Therefore, in order to perform ignition timing correction control for suppressing the front-and-rear vibration of the car body, the program proceeds to a step S608 to perform control. If the result of the decision at the step S606 is YES, namely that $T_W<40°$ C. holds, ignition timing correction for suppressing front-and-rear vibration of the car body is not carried out and the program skips to a step S630, where ignition is performed in accordance with ordinary ignition timing $I_{GN}$. The step S608 calls for computation of the difference ΔG between the car body acceleration G read in at the step S604 and car body acceleration G' read in at step S3 by the last control cycle. Thus, ΔG=G−G' is computed at the step S604. Since the control cycle is executed at a fixed time interval Δt that is predetermined, ΔG essentially represents a differential value of the car body acceleration G with respect to time. A step S610 calls for computing the different ΔTVO between the throttle opening TVO read in at the step S604 and throttle opening TVO' read in at the step S604 in the last cycle. Thus, ΔTVO=TVO−TVO' is computed at the step S610. ΔTVO essentially represents a differential value of throttle opening with respect to time, namely the rate at which the throttle valve 2 opens; the larger ΔTVO, the more rapid the rate at which the throttle valve 2 opens. Since the driver steps down on the accelerator pedal quickly at the start of acceleration, the throttle valve 2 opens rapidly at such time. Accordingly, whether or not acceleration of the engine in excess of a predetermined value has started can be determined based upon whether the valve opening rate ΔTVO of the throttle valve 2 is greater than a predetermined value α(>0).

A step S612 calls for a determination as to whether ΔTVO is less than the predetermined value α, whereby it is determined whether acceleration is being started. Elapsed time following the start of acceleration is preserved in the timer counter CNT, which indicates the number of control cycles (i.e., elapsed time after start of acceleration) performed after the start of acceleration.

It is determined at a step S618 whether CNT>D$_0$ holds. If the answer is NO, the program proceeds to an incrementing step S618. The timer counter CNT is incremented in order from 0 to D$_0$ at the step S618 from the moment acceleration starts until the control cycle is executed D$_0$ times. In other words, the relation CNT>D$_0$ holds during steady-state cruising, in which ΔTVO<α. Therefore, the program proceeds in the order of step S612→step S616→step S626. At step S626, ΔI$_G$=0 holds and torque control is not performed. Immediately after the start of acceleration, the relation ΔTVO>α is established, so that CNT is reset at step S614. This reset state continues in effect so long as ΔTVO>α continues to hold.

Since car body acceleration lags and actually takes place later than the opening of the throttle, vehicle velocity rises even though the relation ΔTVO<α holds and, hence, there is a possibility that car body vibration will occur. Until the time that throttle opening no longer changes (ΔTVO<α) and the value in the counter reaches C$_0$ (i.e. during the time that the relation CNT<C$_0$ holds at step S620), the operation ΔI$_G$=δ is performed at a step S624. As shown in FIG. 7, C$_0$ is a control constant obtained by generalizing and setting a count corresponding to the time required for the car body to attain the first peak after the start of acceleration. The significance of the step S624 is as follows: Since the car body is traveling in the forward direction during the time C$_0$ required for acceleration of the car body to attain the first peak after the start of acceleration, suppression of the front-and-rear vibration of the car body is promoted, and there is almost no decline in acceleration performance, when torque is suitably reduced. Accordingly, it is arranged so that ignition timing correction is carried out by open-loop control (step S624) while the relation CNT<C$_0$ holds. It should be noted that the time period during which CNT<C$_0$ holds includes the time period over which the counter CNT is reset by the relation ΔTVO>α. In addition, the transmission gear position GP, throttle opening TVO, engine rotational speed N and the engine displacement (decelerating state or steady state) judged at the step S602 are stored as parameters in the form of a map.

Figure 14:
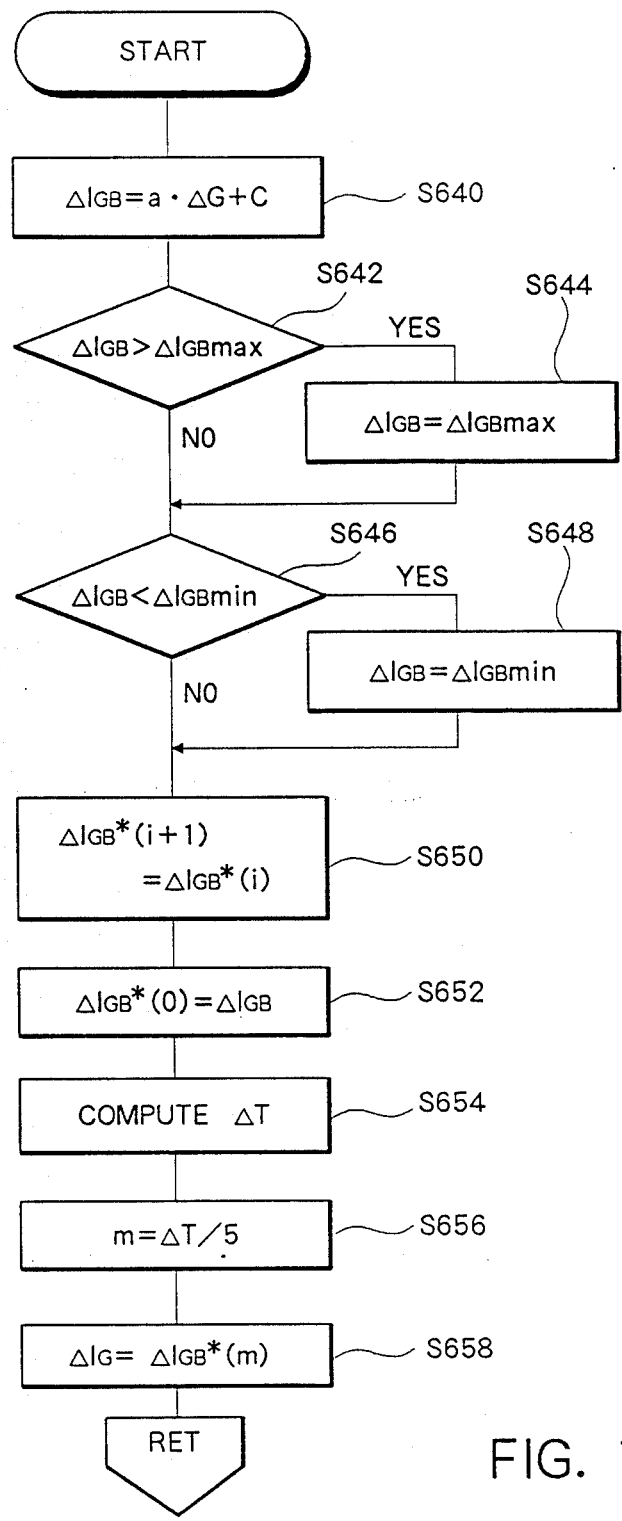

The counter CNT counts with the passage of time. Ignition timing correction is performed in accordance with feedback control at a step S622 while the relation C$_0$<CNT<D$_0$ holds. The computations for determining the amount of ignition timing correction in step S622 are shown in detail in FIG. 14.

When the ignition timing correction calculation subroutine is called, a basic correction factor ΔI$_{GB}$ for ignition timing is calculated at a step S640 in accordance with the equation $$\Delta I_{GB} = a\Delta G + c$$

where ΔG is the differential value of car body acceleration G (front-and-rear acceleration) computed at the step S608 of the main routine, and a and c are constants set in conformance with the engine characteristics. As in the first embodiment, steps S642 through S648 are limit control steps carried out in order to prevent such problems as misfiring and knocking. These steps are for assuring that the basic correction factor ΔIGB will not exceed ΔI$_{Gmax}$ and not fall below ΔI$_{Gmin}$.

A step S650 is for updating an array ΔIGB* of (n+1)-number of the basic correction factors stored in the RAM 42. That is, ΔI$_{GB}$*(i+1)=ΔI$_{GB}$*(i) for i=1~n. A step S652 calls for updating of ΔI$_{GB}$*(0) by the ΔI$_{GB}$ computed at the step S640. The array IGB* thus obtained stores the characteristics (hereinafter referred to as a "basic correction curve"), with respect to time, of the basic correction factor ΔI$_{GB}$ during the time that the relation C$_0$<CNT<D$_0$ holds. In other words, since the basic correction curve is an array of the basic correction factors computed at the step S640, it reflects the sizes of the amplitude and period of the acceleration ΔG of car body vibration.

Steps S654 through S658 are for calculating the final ignition timing correction factor ΔI$_G$ based on the basic correction curve. As will be apparent from the following description, the final ignition timing correction factor ΔI$_G$ computed through the steps S654~S658 is basically nothing more than a correction factor obtained by a phase shift from the basic correction factor ΔI$_{GB}$* for ignition timing. The reason for this phase shift is that resonance of the drive system cannot be effectively suppressed unless the phase of torque control and the phase of the drive system vibration are shifted by a predetermined period of time (preferably a time period corresponding to a crank angle of 180°) during the time C$_0$<CNT<D$_0$.

The step S654 calls for the amount of the abovementioned phase difference to be computed in accordance with the following equation:

$$\Delta T = \frac{CNT}{D_0} \cdot (T_1 - T_2) + T_2$$

In the above equation, T$_1$ and T$_2$ are calculated in accordance with the following equations:

$$T_1 \ (ms) = \frac{1000}{2 \cdot f_1} - T_c$$

$$T_2 \ (ms) = \frac{1000}{2 \cdot f_0} - T_c$$

In these equations, f$_1$ represents resonance frequency (Hz) when control starts, f$_0$ represents the natural frequency (Hz) at the end of control, and T$_c$ denotes the detection delay and control delay time (ms). Among these, f$_0$ corresponds to the resonance frequency shown in FIG. 7 of the first embodiment, and T$_c$ corresponds to the "control delay time" of the first embodiment. Also, T$_1$ (or T$_2$) corresponds to the half period of vibration f$_1$ (or f$_0$).

The above equation relating to the phase difference ΔT is introduced for the following reason: Front-and-rear vibration of the car body at acceleration differs in terms of the period of vibration at the beginning and end of torque control. Though it is preferred in the second embodiment to carry out torque control matched to the car body vibration period at each point in time during the time C$_0$<CNT<D$_0$, the period of vibration actually varies during this time period, as mentioned above. Accordingly, on the assumption that the frequency of vibration varies linearly from f$_1$ to f$_0$, the frequency corresponding to the time equivalent to the value in the counter CNT is obtained by linear interpolation.

The step S656 is for computing an index number for retrieving, from the array ΔI$_{GB}$*, a basic ignition timing correction factor corresponding to the abovementioned phase difference time. In the second embodiment, the corresponding array number m is computed in accordance with the following equation since the time required for one control cycle is 5 ms:

$$m = \Delta T/5$$

Thus, the basic correction factor $\Delta I_{GB}$ computed (step S640) in the control cycle preceding the present time by the phase difference $\Delta T$ is retrieved from the array $\Delta IGB^*$ and read out as the final ignition timing correction factor $\Delta I_G$. This $\Delta I_G$ reflects the final ignition timing $I_G$ (step S658). In other words, the final ignition timing is computed from $$I_G = I_{GN} + \Delta I_G$$

at step S628.

FIG. 12A illustrates the change in output torque, the acceleration of car body vibration and the change in vehicle velocity in a case where control according to the second embodiment is not carried out. Similarly, FIG. 12B shows the same in a case where ignition timing correction control according to the second embodiment is carried out. It will be understood from comparing FIGS. 12A and 12B that engine output torque changes by following up car body vibration, as a result of which the amplitude of car body vibration diminishes. This is because torque control carried out during the time $C_0 \leq CNT \leq D_0$ starts from the moment at which torque control starting time coincides with the initial peak of car body vibration so as to optimally suppress car body vibration. In general, the amount of torsion in the mechanical drive system differs depending upon engine operating state (e.g. the steady cruising state or decelerating state) prior to the start of acceleration. Consequently, the time required for torque to be transmitted to the mechanical drive system differs, and the timing at which the initial peak of car body vibration occurs differs in accordance with the operating state of the engine prior to the start of acceleration. However, in the second embodiment, the time $C_0$ is taken as differing in accordance with the operating state of the engine prior to the start of acceleration. Therefore, even though the operating state of the engine before the start of acceleration differs, coincidence is established between the initial peak of car body vibration and the timing at which torque control starts. As a result, torque control for optimum suppression of vibration is carried out.

(Summary of the Embodiments)

Thus, in accordance with the engine control system of the first embodiment and the modifications thereof, a control delay time which occurs in the control system or a control delay time as an ignition delay time is taken into account in torque control. As a result, car body vibration and torque control timing coincide, so that reliable suppression of engine vibration which could not actually be controlled in the prior art is made possible.

In particular, car body vibration in the low rotational speed region is assuredly suppressed by shortening the averaging time in the low rotational speed region when computing rotational speed fluctuation, or by using control data retarded by one period in controlling torque in the region of low rotational speed. In other words, a shift in timing which arises in electronic control is eliminated.

In accordance with the second embodiment car body vibration and torque control timing coincide and optimum suppression of vibration is realized regardless of the operating state of the engine prior to the start of acceleration. In other words, a shift in timing which arises in the mechanical drive system is eliminated.

As will readily be understood from the first and second embodiments, the present invention makes it possible to positively suppress car body vibration by synchronizing car body vibration and the timing of torque control for suppressing this vibration.

What is claimed is:

1. An engine control system for suppressing vibration of a car body by varying engine output torque, comprising:
   vibration data detecting means for intermittently detecting data relating to car body vibration;
   period setting means for setting a period of car body vibration;
   delay time setting means for setting a delay time corresponding to a detection delay time due to the intermittent detection of said vibration data detection means; and
   torque control means for controlling engine output torque by advancing a phase of engine output torque control timing by the delay time corresponding to the detection delay time, which is set by said delay time setting means, in each period of car body vibration set by said period setting means, thereby suppressing car vibration.

2. The system according to claim 1, wherein the control variable is ignition timing and said torque control means includes:
   means for detecting an ignition cycle, and
   ignition means for igniting a gasoline mixture every detected ignition cycle based on a computed ignition timing.

3. The system according to claim 1, where said vibrating data detecting means includes means for detecting a fluctuation in engine rotational speed, and the detected car body vibration is a fluctuation in engine rotational speed.

4. The system according to claim 1, where said vibrating data detecting means includes means for detecting acceleration of front-and-rear vibration of the car body, and the detected car body vibration is acceleration of car body vibration.

5. The system according to claim 1, wherein the data relating to car body vibration is a fluctuating value of engine rotational speed;
   said vibrational data detecting means includes fluctuating value detecting means for detecting the fluctuating value of engine rotational speed;
   said delay time setting means includes means for computing a time which is one-fourth of the car body vibration period set by said period setting means and means for subtracting said one-fourth of the car body vibration period from said time corresponding to the control delay time; and
   said torque control means advances the phase of engine output torque control timing by said subtracted time.

6. The system according to claim 1, wherein the data relating to car body vibration is that based on an engine rotational speed; and
   said vibration data detecting means includes means for detecting a signal which is intermittently generated every prescribed crank angle and means for calculating an engine rotational speed based on said signal.

7. The system according to claim 1, wherein said period setting means includes means for detecting the gear position of a transmission; and the period of car body vibration is set in accordance with the detected gear position by said period setting means.

8. The system according to claim 6, wherein said torque control means includes ignition timing control means for controlling the ignition timing of the engine at every engine rotation and said delay time setting means sets the delay time to a larger value as the engine rotational speed is smaller.

9. The system according to claim 5, wherein the car body vibration is defined as the difference between a fluctuating value of engine rotational speed and a mean value of the fluctuating values of engine rotational speed;

said vibration data detecting means includes means for detecting a signal which is intermittently generated every prescribed crank angle, means for calculating an engine rotational speed based on said signal, means for calculating fluctuating values of engine rotational speed and mean value calculating means for calculating a mean value of the fluctuating values of engine rotational speed; and when an engine rotational speed is low, said mean value calculating means shortens a computation period of the mean value of the fluctuating values of engine rotational speed.

10. The system according to claim 6, wherein said delay time setting means includes means for computing a time which is five-fourths of the car body vibration period set by said period setting means and means for subtracting said five-fourths of the car body vibration period from said delay time corresponding to the control delay time; and said torque control means advances the phase of engine output torque control timing by the subtracted time when an engine rotational speed is low.

11. The system according to claim 10, wherein the low rotational speed region of the engine is defined as a region where the control delay time is longer than one-fourth of the car body vibration period.

12. An engine control system for suppressing vibration of a car body at acceleration thereof having torque control means for controlling engine output torque, the system comprising:

operating condition detecting means for detecting operating conditions which prevail prior to acceleration;

acceleration detecting means for detecting acceleration;

actuating means for actuating said torque control means a predetermined time after acceleration is detected by said acceleration detecting means; and varying means for varying said predetermined time in dependence upon the operating conditions which prevail prior to acceleration detected by said operating condition detecting means, whereby timing of car body vibrations and timing of torque control are synchronized by altering, in dependence upon the operating conditions prior to acceleration, the timing at which torque control starts.

13. The system according to claim 12, wherein said operating condition detecting means detects steady-state travel.

14. The system according to claim 12, wherein said operating condition detecting means detects decelerating travel.

15. The system according to claim 12, wherein said torque control means includes means for detecting an ignition cycle and means for igniting a gasoline mixture at ignition timing, whereby said torque control means controls the output torque of the engine.

* * * * *

UNITED STATES PATENT AND TRADEMARK OFFICE
CERTIFICATE OF CORRECTION

PATENT NO. : 4,928,652

DATED : May 29, 1990

INVENTOR(S) : Yoshiyuki SHINYA, et al.

It is certified that error appears in the above-identified patent and that said Letters Patent is hereby corrected as shown below:

On the title page, in item [56] References Cited, in reference to
Pat. No. 4,532,902 "Onizuno et al." should be --Mizuno et al.--.

Col. 1, line 23, "a" should be --an--.

Col. 4, line 36, after "value" insert --of--.

Col. 5, line 47, after "12B" insert --are graphic views--.

Col. 6, line 4, after "as" insert --a--;

line 41, change "angle" to --angle,--.

Col. 7, line 22, delete "C.".

Col. 13, line 63, after "factor" insert --$\Delta I_G$ in --.

Signed and Sealed this

Thirtieth Day of June, 1992

*Attest:*

DOUGLAS B. COMER

*Attesting Officer*       *Acting Commissioner of Patents and Trademarks*